(12) United States Patent
Bürgin

(10) Patent No.: US 11,583,901 B2
(45) Date of Patent: Feb. 21, 2023

(54) DEVICE AND A METHOD FOR CLEANING INTERIORS OF RECEPTACLES AND FACILITIES

(71) Applicant: Bang & Clean GMBH, Othmarsingen (CH)

(72) Inventor: Markus Bürgin, Remetschwil (CH)

(73) Assignee: BANG & CLEAN GMBH, Othmarsingen (CH)

( * ) Notice: Subject to any disclaimer, the term of this patent is extended or adjusted under 35 U.S.C. 154(b) by 619 days.

(21) Appl. No.: 16/615,509

(22) PCT Filed: May 24, 2018

(86) PCT No.: PCT/EP2018/063618
§ 371 (c)(1),
(2) Date: Nov. 21, 2019

(87) PCT Pub. No.: WO2018/215582
PCT Pub. Date: Nov. 29, 2018

(65) Prior Publication Data
US 2020/0094296 A1 Mar. 26, 2020

(30) Foreign Application Priority Data
May 24, 2017 (CH) .................................. 00682/17

(51) Int. Cl.
*F16L 11/15* (2006.01)
*B08B 7/00* (2006.01)
(Continued)

(52) U.S. Cl.
CPC .............. *B08B 7/0007* (2013.01); *B08B 9/08* (2013.01); *F16L 11/088* (2013.01); *F16L 11/15* (2013.01);
(Continued)

(58) Field of Classification Search
CPC ...... B08B 7/0007; F27D 25/006; F22B 37/486
(Continued)

(56) References Cited

U.S. PATENT DOCUMENTS 3,934,618 A * 1/1976 Henderson ................ F28F 1/08
138/116
4,384,595 A 5/1983 Washkewicz et al.
(Continued)

FOREIGN PATENT DOCUMENTS

CN 103322343 9/2013
DE 3600100 4/1987
(Continued)

OTHER PUBLICATIONS

English translation of International Preliminary Report on Patentability dated Nov. 26, 2019, Application No. PCT/EP2018/063618, 10 pages.

*Primary Examiner* — Patrick F Brinson
(74) *Attorney, Agent, or Firm* — Rankin, Hill & Clark LLP

(57) ABSTRACT

An appliance and a method for removing deposits from interiors of receptacles or facilities by way of explosion technology. The appliance includes a supply device for providing an explosive mixture or its starting components, as well as a transport conduit that is connected to the supply device and serves for transporting explosive mixture to a cleaning location. The transport conduit is designed at least in sections as a transport hose.

31 Claims, 10 Drawing Sheets

(51) Int. Cl.
  *B08B 9/08* (2006.01)
  *F16L 11/08* (2006.01)
  *F16L 11/16* (2006.01)
  *F22B 37/48* (2006.01)
  *F27D 25/00* (2010.01)

(52) U.S. Cl.
  CPC ............ *F16L 11/16* (2013.01); *F22B 37/486* (2013.01); *F27D 25/006* (2013.01)

(58) Field of Classification Search
  USPC ........ 138/121, 122, 129, 148, 140, 144, 150
  See application file for complete search history.

(56) References Cited

U.S. PATENT DOCUMENTS

| | | | | |
|---|---|---|---|---|
| 5,129,429 | A * | 7/1992 | Winter | F16L 11/115 138/132 |
| 5,307,743 | A | 5/1994 | Jones | |
| 6,116,287 | A * | 9/2000 | Gropp | F16L 51/027 138/123 |
| 6,230,748 | B1 * | 5/2001 | Krawietz | F16L 27/111 138/123 |
| 6,334,466 | B1 | 1/2002 | Jani et al. | |
| 6,935,281 | B2 * | 8/2005 | Ruegg | B08B 9/08 165/84 |
| 7,571,745 | B2 * | 8/2009 | Baumhoff | F01N 13/1816 138/135 |
| 8,569,622 | B2 * | 10/2013 | Katou | H02G 3/0468 174/72 A |
| 9,636,717 | B2 * | 5/2017 | Flury | F27D 25/006 |
| 10,065,220 | B2 * | 9/2018 | Flury | B08B 7/0007 |
| 2004/0060608 | A1 * | 4/2004 | Angus | F16L 13/08 138/121 |
| 2004/0112306 | A1 * | 6/2004 | Ruegg | F27D 25/006 122/379 |
| 2007/0023097 | A1 | 2/2007 | Milhas | |
| 2009/0277479 | A1 | 11/2009 | Lupkes | |
| 2014/0311610 | A1 * | 10/2014 | Kwon | F16L 11/15 138/121 |
| 2015/0343501 | A1 | 12/2015 | Flury et al. | |
| 2016/0346813 | A1 * | 12/2016 | Bürgin | F27D 25/006 |

FOREIGN PATENT DOCUMENTS

| | | |
|---|---|---|
| DE | 10 2012 108 183 | 3/2013 |
| EP | 1 067 349 | 1/2001 |
| EP | 1 362 213 | 12/2004 |
| JP | 58-59832 | 4/1983 |
| JP | 60-88189 | 6/1985 |
| JP | 2004-526935 | 9/2004 |
| JP | 2008-202906 | 9/2008 |
| JP | 2009-281463 | 12/2009 |
| JP | 2017-512126 | 5/2017 |
| WO | 99/15326 | 4/1999 |
| WO | 2013/082731 | 6/2013 |

* cited by examiner

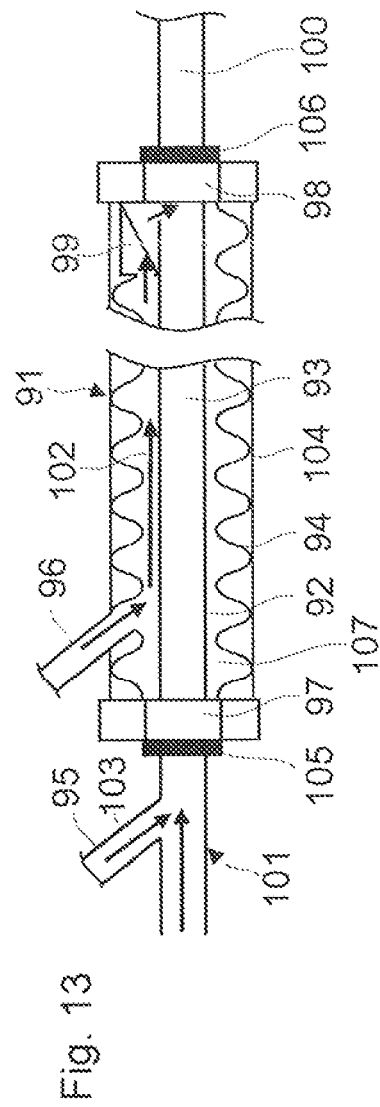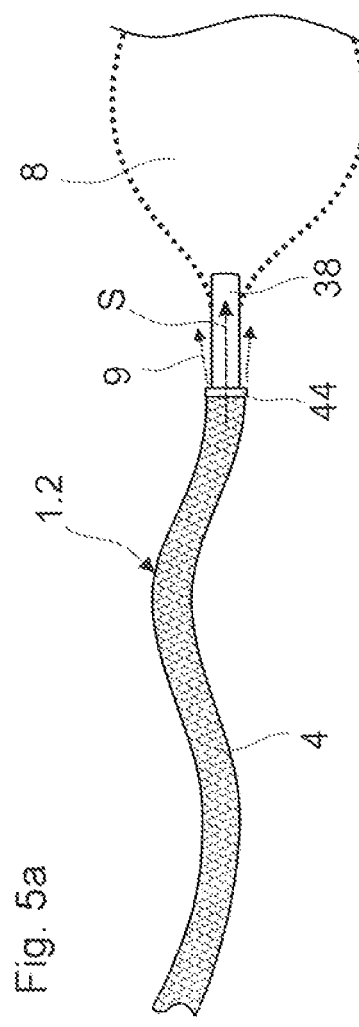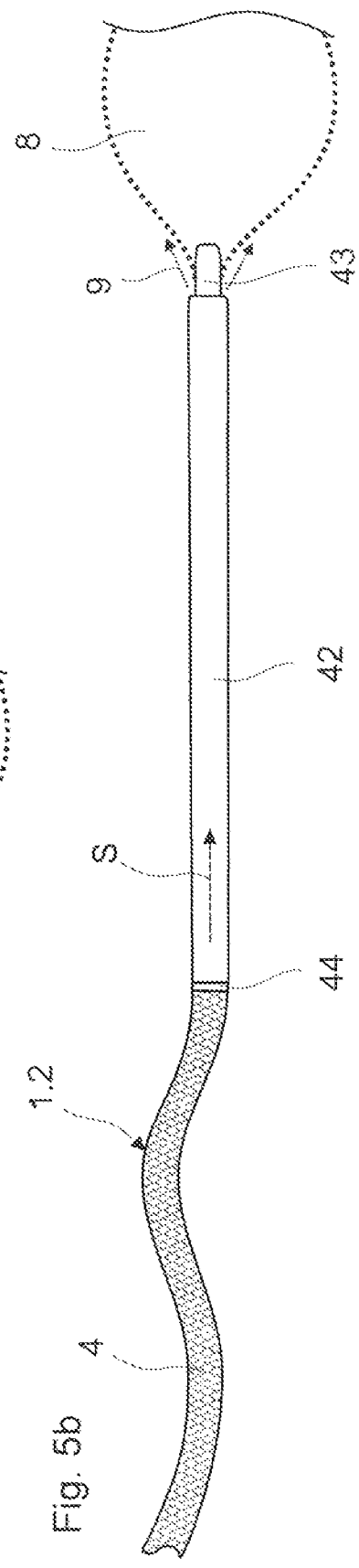

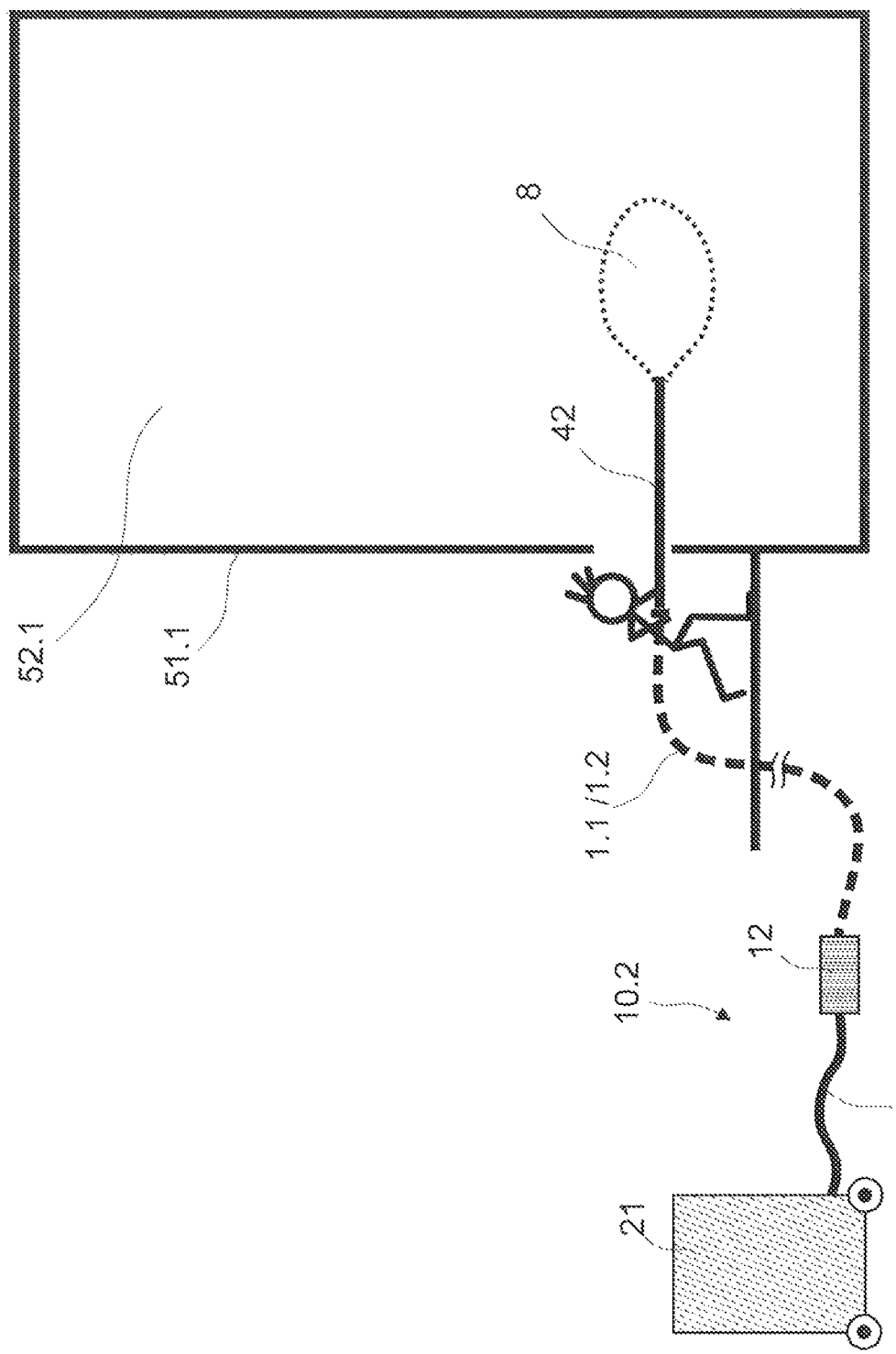

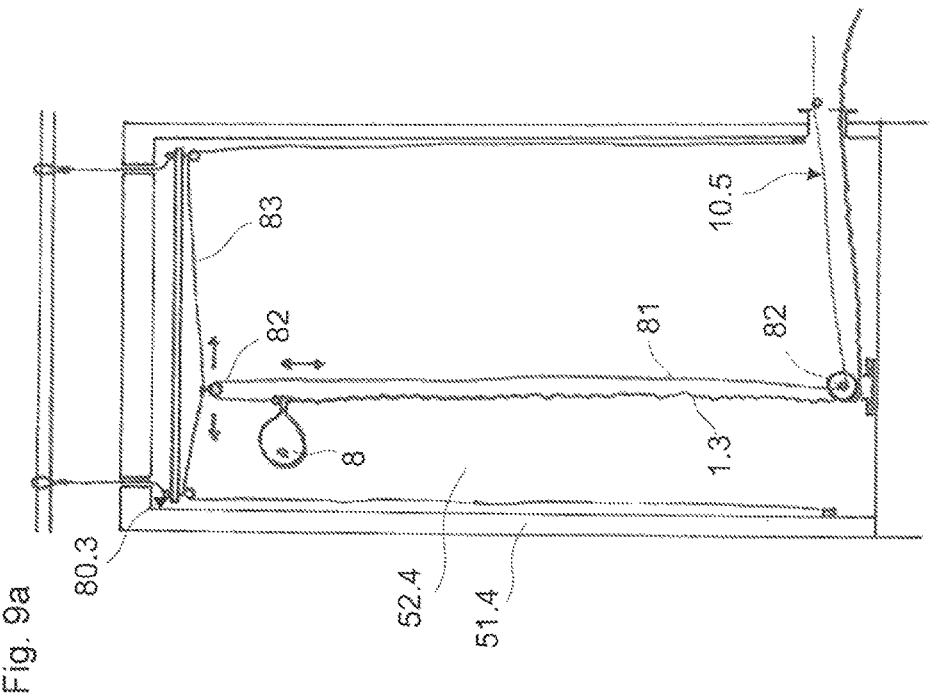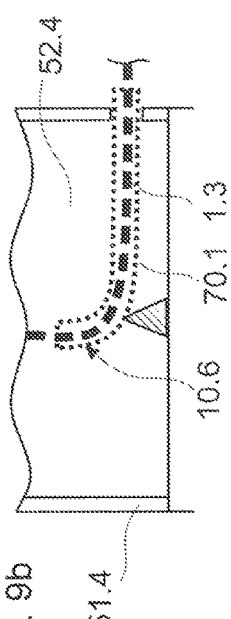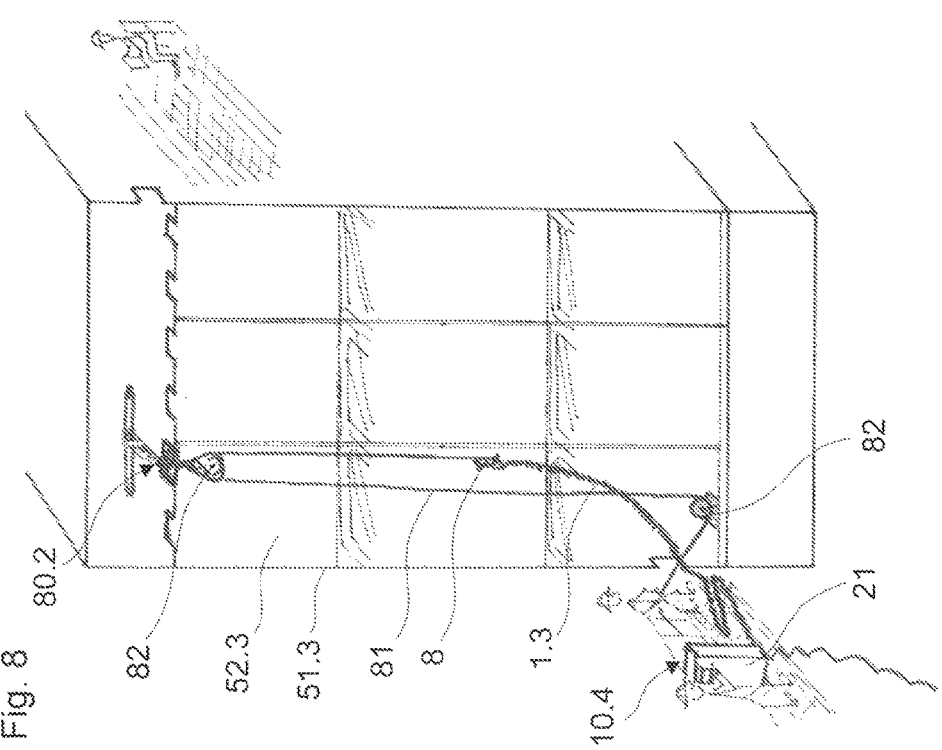

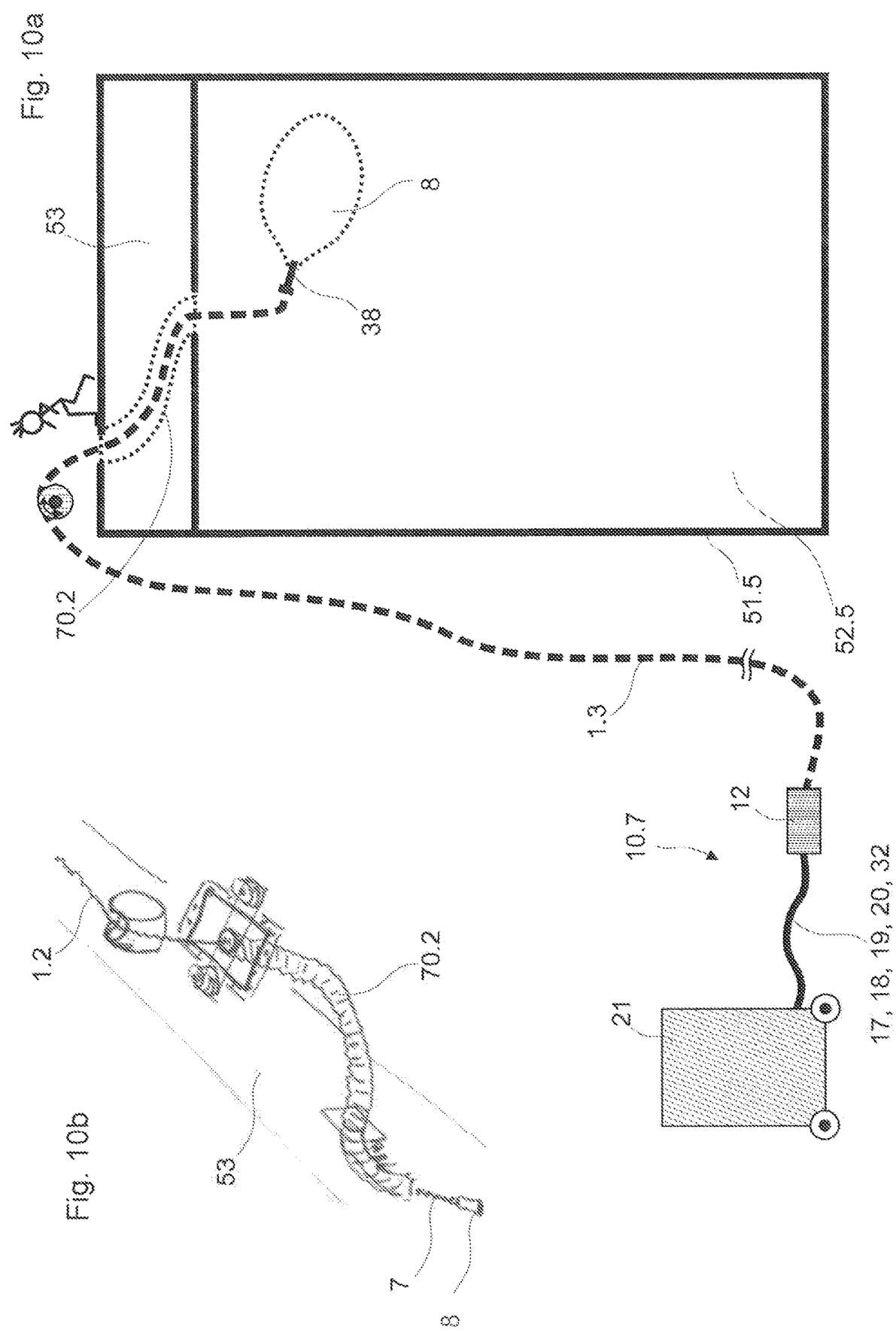

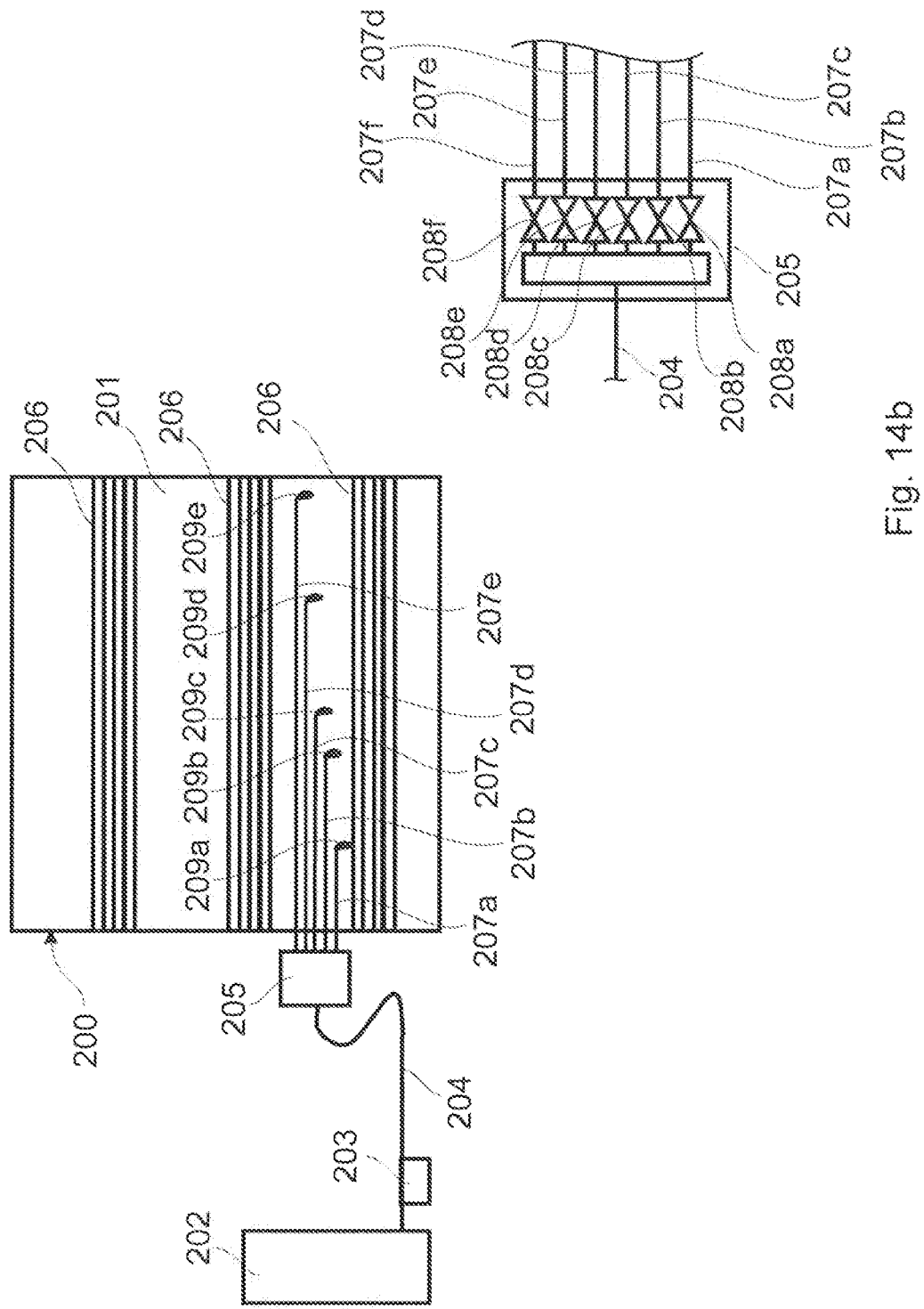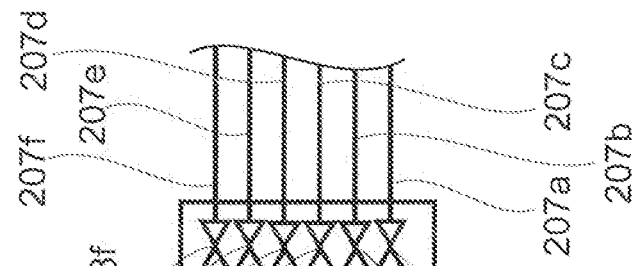

DEVICE AND A METHOD FOR CLEANING INTERIORS OF RECEPTACLES AND FACILITIES

BACKGROUND OF THE INVENTION

Field of the Invention

The invention relates to the field of cleaning interiors of receptacles and facilities. It relates to an appliance as well as to a method for removing deposits in interiors of receptacles and facilities by way of explosion technology.

Description of Related Art

The appliance includes a supply device for providing an explosive mixture or its starting components, as well as a transport conduit for transporting the explosive mixture to a cleaning location, the transport conduit being connected to the supply device.

The appliance and method especially serve for cleaning dirty and slagged incineration facilities with caking or deposits on their inner walls.

The interiors of incineration facilities, e.g. of waste incineration facilities or thermal power stations, which are subjected to the incineration/combustion process in a direct or indirect manner, or also of waste heat boilers, which are arranged downstream of such facilities, are subjected to a greater or lesser fouling during their operation.

This fouling has inorganic compositions and typically arises due to deposits of ash particles on the wall. Coatings in the region of high flue gas temperatures are mostly very hard, since they remain stuck to the wall either in molten form or are melted on the wall or are stuck together by way of substances melting or condensing at a lower temperature, when solidifying on the colder boiler wall. Such coatings are very difficult to remove and are inadequately removed by way of known cleaning methods.

This leads to the boiler, which forms the combustion chamber, having to be periodically taken out of service and cooled for the purpose of cleaning. For this, the construction of a scaffold in the boiler is often necessary, since such boilers usually have extremely large dimensions. This moreover requires an operational interruption of several days or weeks and is extremely unpleasant and unhealthy for the cleaning personnel due to the large occurrence of dust and dirt. One consequence, which mostly inherently occurs with an operational interruption of an installation, is damage to the container materials themselves as a result of the large temperature changes. The installation standstill costs due to the production or income losses are an important cost factor, additionally to the cleaning and repair costs.

Conventional cleaning methods, which are used when the installations are shut down, are, for example, boiler beating, as well as the use of steam jet blasters, water jet blasters/soot blasters as well as sand blasting.

Moreover, a cleaning method is known, with which the cooled-down or the hot boiler, which is in operation, is cleaned by way of introducing and igniting explosive bodies. With the method described in the published document EP 1 067 349, an explosive body is brought by way of a cooled lance into the proximity of the fouled heating surface, where the explosive charge is ignited. The heat surface caking is blown away due to the impact of the detonation, as well as due to the wall oscillations produced by the shock waves. The cleaning time can be significantly shortened with this method, in comparison to the convention cleaning methods. With the necessary safety precautions, the cleaning can take place during the operation of the incineration or combustion furnace, which is to say still in the hot condition of the receptacle. Thus, it is possible to clean a boiler in this manner within hours and without an operational interruption, for which conventional cleaning methods require days.

The disadvantage with this method is the use of explosives. Apart from the high costs for the explosive, a huge expense with regard to safety must be met, for example with the storage of the explosive, in order to avoid accidents or theft. The introduction of explosive material into a hot container moreover necessitates an absolutely reliable and efficient cooling system, in order to prevent a premature detonation of the explosive. Furthermore, in many countries, the handling of explosives is only permitted with a special authorisation whilst adhering to strict conditions due to the dangerous nature and possible misuse. This can be a hindrance to daily work.

A further cleaning method is known from EP 1 362 213 B1, which likewise makes use of means for the production of an explosion. Instead of explosive, according to this method, however, a container envelope, which is inflatable with an explosive gas mixture, is attached onto the end of a cleaning lance. The lance then together with the empty container envelope is introduced into the boiler space and is positioned in the proximity of the location to be cleaned. Subsequently, the container envelope is inflated with an explosive gas mixture. An explosion is produced by way of igniting the gas mixture in the container envelope, and the shock waves of this explosion lead to the detachment of fouling on the boiler walls. The container envelope is shredded and combusted by way of the explosion. It, therefore, represents a consumable material.

This method and the associated appliance, compared to the aforementioned explosive technology with explosives, have the advantage that the method is inexpensive with regard to operation. Thus, e.g., the starting components of a gas mixture, which includes oxygen and a combustible gas such as ethylene, are inexpensive compared to explosives. Moreover, the procurement and handling of the mentioned gases in comparison to explosives requires no special permits or qualifications, so that anyone who has accomplished a corresponding training is capable of carrying out the method.

Moreover, it is also advantageous that the starting components are fed to the cleaning lance via separate feed conduits and the dangerous explosive gas mixture therefore not created until in the cleaning lance shortly before triggering the explosion. In comparison to explosives, the handling of the individual components of the gas mixture is indeed far less dangerous, since these at most are individually combustible, but are not explosive.

The handling with a cleaning lance as is described in EP 1 362 213 B1 however has the disadvantage that the radius of action in the inside of the receptacle is limited. The radius of action, although being able to be increased by way of a larger lance length, this however entails small radii not being able to be overcome with a longer cleaning lance, in order to get to the difficultly accessible locations. Furthermore, a longer cleaning lance, although increasing the radius of action, such however is also more bulky and accordingly more difficult in its handling.

SUMMARY OF THE INVENTION

It is therefore the object of the present invention to modify the cleaning appliance, which is described in the published document EP 1 362 213 B1, such that the locations that are to be cleaned are more easily accessible with the cleaning appliance and even inaccessible locations can be more easily and simply reached.

Furthermore, the handling of the cleaning appliance is to be simplified and safer and the flexibility is to be increased.

The invention is characterised in that the transport conduit at least in a section or in sections is designed as a transport hose.

The term "hose" in this invention is to be understood as a flexible, elongate hollow body. The hose differs from a tube (pipe) by its flexibility. In this context, flexible in particular means that the transport hose can be deflected out of its longitudinal axis or out of the longitudinal direction in all directions.

In particular, the term "hose" is not to be limited to a certain material or material group. The hose, for example, can therefore be of plastic or metal or a combination thereof.

In particular, the transport hose includes round, very particular a circular basic cross section.

The transport conduit or the transport hose forms a closed transport channel, through which an explosive mixture can be transported. The transport is effected from the feed-side supply device to the cleaning-side outlet opening of the transport conduit or of the transport hose.

In particular, "feed-side" means arranged towards the supply device or at the supply device. In particular, "cleaning-side" means towards the location to be cleaned (cleaning location) or at the cleaning location, in the operational position.

The transport channel can form a circular cross section.

The transport channel can have a (largest diameter) of 60 mm or less, of 50 mm or less, of 40 mm or less, of 30 mm or less, or even of 20 mm or less.

The (largest) diameter can be 5 mm or larger, 10 mm or larger, 20 mm or larger, or even 30 m or larger.

If the transport channel is designed from a hose of plastic, such as, e.g., polytetrafluoroethylene (PTFE), as is described further below in more detail, then the largest diameter of the transport channel can be dimensioned smaller on account of its smooth inner wall and, resulting from this, the lower pressure loss or flow resistance on leading through the explosive mixture.

The largest diameter of the transport channel in this case can be 20 mm or less, in particular 10 mm or less and very particularly 5 mm or less.

The transport hose according to the invention can be applied in different manners. On the one hand, the transport hose can serve for bridging the distance between the supply device or a metering unit or an inlet device and the introduction opening into the receptacle or facility to be cleaned.

In contrast to conventional cleaning lances, the supply device or the metering unit or the inlet device does not need to be brought along each time given a change of the introduction opening into the receptacle or facility to be cleaned. The various introduction openings for cleaning the interior of the receptacle or facility from different sides are simple and comfortable to reach via a suitably long transport hose without carrying along the supply device or the metering unit or the inlet device.

On the other hand, the transport hose can be used for extending the radius of action in the inside of the receptacle or facility which is to be cleaned. A larger region in the inside of the receptacle or facility can before be covered by a single introduction opening thanks to the transport hose.

The cleaning of the receptacle or facility can take place online, which is to say given running operation of the facility and accordingly at high temperatures of several hundred of degrees Celsius, or offline at stopped or reduced operation and accordingly lower temperatures.

The construction of the transport hose as well as the applied materials can be different due to the different demands upon the thermal stability (heat-resistance) depending on the application purpose of the transport hose, e.g., outside the receptacle or facility which is to be cleaned, or within the receptacle or facility which is to be cleaned, but offline, or within the receptacle or facility to be cleaned and online. This will be dealt with in more detail hereinafter.

In particular, the transport hose includes a gas-impermeable hose or consists of this.

According to a further development, the gas-impermeable or gas-tight hose forms a (closed) transport channel for an explosive mixture.

According to a particular embodiment, the gas-impermeable hose consists of plastic or includes plastic. The plastic can, e.g., be a duroplastic or a thermoplastic. The plastic can be, e.g., polyvinyl chloride (PVC), a polyurethane (PUR) or a polytetrafluoroethylene (PTFE).

The mentioned hose of plastic can include reinforcement fibres, which are integrated into this. These can be present as a textile sheet formation, such as a braiding. In particular, the reinforcement fibres serve for increasing the tensile strength and/or pressure strength of the hose.

However, a gas-impermeable hose can also consist of metal, as is yet explained further below.

According to a further development of the invention, the transport hose is constructed in a multi-layered manner. In particular, the transport hose can include several hoses of a different material and/or structural nature, which are led in one another.

A cooling channel, in particular an annular cooling channel can be formed between two hoses, in particular between two gas-impermeable or liquid-impermeable hoses. The cooling medium can be fed into the cooling channel, e.g., via an inlet such as an inlet nozzle (inlet stub). The inlet can be arranged on the transport hose or on the inlet device or mixing unit.

The cooling channel in particular serves for cooling a connection component, which connects onto the transport hose at the cleaning side, such as a tube body or lance body and/or a container envelope, which are inserted into the hot interior of the receptacle or facility to be cleaned given a hot application (online application).

However, the mentioned cooling channel can also serve for cooling the transport hose. This hose heats up due to the ignition of the explosive mixture in the transport channel. Moreover, the transport hose also heats up given an online application, i.e., when the transport hose must be inserted into the hot interior of the receptacle or facility to be cleaned.

The cooling medium is delivered through the cooling channel to the cleaning-side end of the transport hose.

According to a first variant, the cooling channel includes an outlet opening at the cleaning-side end of the transport hose, so that cooling medium exits to the outside and, e.g., a connecting component (connection component) and/or a container envelope is cooled from the outside.

If with regard to the connection component it is the case of a tube (pipe) body, then according to a second variant the cooling medium can be led via an outlet opening into the inside of the tube body in the region of the cleaning-side end of the transport hose, in particular in the connection region or coupling region between the transport hose and the tube body, and cool this tube body from the inside. In particular, the outlet opening runs out into the transport channel of the transport hose at the cleaning-side end section.

In both variants, in particular a valve is arranged in the region of the outlet opening. In particular, the valve is mechanically controlled. In particular, the valve is designed as a check valve and, in particular is to prevent the penetration of a liquid or gaseous medium into the cooling channel from the outside.

The control of the feed of the cooling medium can be effected via a controlled inlet valve, which is arranged at the feed side.

In particular, the hoses of a multi-layered transport hose are loosely inserted into one another. Inner-lying hoses can be pulled out of the transport hose again by way of this, for example for the purpose of exchange.

In particular, the transport hose can include a first hose and inner-lying second hose, which is surrounded by the first hose and is gas-impermeable.

The transport hose can include a hose, in particular a protective hose, which includes one or more of the subsequent characteristics or protective functions:
pressure-resistance;
tensile strength.

This hose, hereinafter called first hose, in particular is pressure-resistant with regard to pressure forces, which are directed radially from the inside to the outside. Such radially acting pressure forces occur, for example, on igniting the explosive mixture in the transport channel as well as given undesirable back-ignitions. The inner-lying hose is protected from damage caused by radially acting pressure forces by way of this.

The first hose can moreover also be tensionally strong with regard to axially acting tensile forces. The inner-lying hose is protected from damage due to axially acting tensile forces on account of this.

Further or alternative protective functions, which the first hose or protective hose can carry out are:

Protection from heat (e.g. contact with hot facility parts), flames and radiation; Protection from mechanical action from the outside, such as friction, abrupt bending, perforation, etc.

In particular, the first hose of metal, such as steel.

The first hose can be a hose braiding (braided hose). In particular, the hose braiding is of metal such as steel. In particular, the hose braiding is a wire braiding.

As already mentioned above, in particular the transport hose contains a hose that is gas-impermeable, i.e. gas-tight. This hose, hereinafter called second hose for differentiation, in particular is an inner-lying hose that is surrounded by the first hose.

According to an embodiment variant, the second hose can be a corrugated hose. A corrugated hose is a hose of a rigid material, e.g., of metal, with a diameter that changes in a wavelike manner and which has become flexible on account of the corrugation. The waves at the outer arc stretch apart on bending, whereas they are simultaneously squashed together in the inner arc.

In particular, the corrugated hose includes an annular corrugation. Corrugated hoses of metal are also known colloquially as corrugated pipes.

In particular, the corrugated hose is of metal, such as steel (rust-free steel or stainless steel). The corrugated hose can be of chromium steel.

The corrugated hose can be manufactured from a base profile by way of welding or hydraulic reshaping (forming).

In particular, corrugated hoses of metal are applied as heat-resistant, gas-impermeable or liquid-impermeable hoses in hot applications.

In contrast to a gas-impermeable hose, which is mentioned above and which is of a plastic or a includes a plastic, the corrugated hose in particular does not form the transport channel despite the gas-impermeability, due to the corrugated profile and the high surface roughness on the hose inner side which this entails.

For this reason, the transport hose can include a further hose that forms the transport channel. This hose, hereinafter called third hose for differentiation, is accordingly arranged lying at the inside in the case of a multi-layered construction. In particular, the third hose can be surrounded by the second hose.

In particular, the third hose is characterised in that its inner wall has unevenness, i.e., roughness, which is lower compared to the second hose.

It is by way of the application of a third hose that the flow resistance is to be significantly reduced compared to the corrugated hose whose inner wall is designed in a corrugated manner inherent of the design. The reduction of the flow resistance in the transport channel by way of a smooth as possible inner wall is to permit smaller cross sections for the transport channel. The total diameter of the transport hose can also be kept small in this manner.

In particular, the third hose is a stripwound hose. In particular, the stripwound hose is of metal, such as steel (rust-free steel or stainless steel). The stripwound hose can be of chromium steel.

Stripwound hoses consist of windings that are loosely hooked into one another. They are flexible on account of this. Stripwound hoses can be manufactured with a hook profile or fold profile such as, for example, the agraffe profile. Stripwound hoses without special sealing measures are not gas-tight or liquid-tight due to the loose meshing of the profiles.

This, however, is not absolutely necessary for the present invention since the third hose is primarily to ensure a smooth as possible inner wall and not necessarily sealedness. In particular, the sealedness is ensured by the second hose.

However, the third hose can also be a gas-impermeable hose of plastic or including a plastic, as is yet explained further below. The respective disclosure further below is referred to concerning further details on the design of a hose of plastic or including plastic.

According to a further development of the transport hose, as already mentioned above, this includes an annular channel for the transport of a cooling medium, the annular channel indirectly or directly surrounding the transport channel or the hose which forms the transport channel.

According to a further development, the mentioned annular channel can be formed between the second and the third hose, inasmuch as the third hose is likewise gas-impermeable or liquid-impermeable.

According to a further development, the transport hose includes an outer-lying hose, hereinafter called fourth hose for the purpose of differentiation. In particular, the fourth hose is liquid-impermeable, i.e., liquid-tight. In particular, the fourth hose is also gas-impermeable, i.e., gas-tight.

In particular, the fourth hose is the outermost hose. The outermost hose forms the outer surface of the transport hose.

If no fourth hose is provided, then it is particularly the first hose that forms the outermost hose.

In particular, the fourth hose surrounds the first hose. An annular cooling channel for a cooling medium is formed between the inner-lying, first hose and the outer-lying, fourth hose.

The fourth hose can likewise be a corrugated hose. In particular, the corrugated hose is of the type described above. In particular, the corrugated hose is of metal, as already described above.

A fourth hose in the embodiment of a corrugated hose of metal, such as steel, in particular is used if the transport hose needs to be inserted into the hot interior of the receptacle or of the facility for the purpose of cleaning. The fourth hose must accordingly be heat-resistant, which is to say thermally durable in this case.

The fourth hose can also be of a plastic. In particular, the fourth hose has elastic characteristics, which give it the necessary flexibility. The fourth hose of plastic can include reinforcement fibres. These can be present as a textile sheet formation such as a braiding.

A fourth hose of plastic can be used when this does not need to be heat-resistant or thermally durable. This is the case, for example, if the transport hose is not inserted into the hot interior of the receptacle or facility that is to be cleaned.

According to a further variant, the transport hose, although being introduced into the interior of the receptacle or facility to be cleaned, the receptacle or the facility however is not in operation (offline application) and the interior has accordingly cooled own, so that no thermal resistance or heat durability is necessary.

The fourth hose can consist of an elastomer, such as ethylene propylene diene monomer rubber (EPDM). The fourth hose can alternatively include an elastomer such as ethylene propylene diene monomer rubber (EPDM).

The aforementioned first, second, third and fourth hoses are led in one another in the specified manner. This means that they are arranged concentrically to one another in cross section.

According to another embodiment, the transport hose consists of a plastic, such as polyurethane, polyvinyl chloride or polytetrafluoroethylene (PTFE), as is mentioned above. It is also possible for the transport hose to include a hose of plastic such as polyurethane, polyvinyl chloride or polytetrafluoroethylene (PTFE). The hose can also include the mentioned plastic.

The hose of plastic, such as polyurethane, polyvinyl chloride or polytetrafluoroethylene (PTFE) in particular forms the transport channel. In particular, the mentioned hose is gas-impermeable, as mentioned.

The transport hose according to this embodiment can likewise be constructed in a multi-layered manner. In particular, the hose of plastic, such as polyurethane, polyvinyl chloride or polytetrafluoroethylene (PTFE) or including a plastic is the innermost hose.

In particular, the transport hose according to this embodiment can include several, such as two or three hoses of a different material and/or structural nature that are led in one another.

The hose of plastic, such a polyurethane, polyvinyl chloride or polytetrafluoroethylene (PTFE), according to a further development of the invention and analogously to the variant with a stripwound hose that has been described further above can be led in a protective hose, i.e., be surrounded by this. The protective hose executes one or more of the aforementioned protective functions.

The protective hose can be of metal.

The protective hose can be an in particular pressure-resistant hose braiding. In particular, the hose braiding is of metal such as steel. In particular, the hose braiding is a wire braiding.

According to a further development of the invention, the hose of plastic can be surrounded by a liquid-tight and possibly also gas-tight hose, which together with the hose of plastic forms the annular cooling channel that is mentioned further above.

In particular, the liquid-tight and in particular also gas-tight hose is of metal, such as steel.

The mentioned hose can be of plastic or include a plastic.

The mentioned hose can, e.g., be a corrugated hose. The corrugated hose can be designed according to the type that is described further above.

In particular, the mentioned hose can be arranged between a protective hose and the inner-lying plastic hose, which forms the transport channel.

According to a particular further development, the protective hose and the liquid-impermeable or gas impermeable hose for forming the annular cooling channel are formed from one and the same hose.

As already mentioned above, the gas-impermeable hose of plastic can be loosely inserted into the hose or hoses that surrounds/surround this. This permits the simple and rapid exchange (due to wear) of the hose of plastic.

Hoses of plastic are particularly used in offline applications when the receptacle or facility that is to be cleaned has cooled down, or outside the receptacle or facility to be cleaned, for overcoming distances between the supply device and the inlet opening of the receptacle to be cleaned.

Instead of via an annular cooling channel, the cooling medium can otherwise also be transported to the component and/or a container envelope that connect onto the transport hose at the cleaning side, via a separate cooling hose. This cooling hose can be arranged, for example, in the transport channel or in an annular channel between two hoses. The diameter of the cooling hose, in particular, is a fraction of the diameter of the innermost hose, e.g., a few millimetres, in particular up to maximally 5 mm. The cooling hose only takes up a low part of the cross-sectional area of the transport channel or has space in the annular gap of the annular channel in such a manner.

In particular, such a cooling hose is of plastic.

The length of the transport hose can be several metres. The length of the transport hose can, e.g., be 5 metres or more, in particular 10 metres or more. Basically, the length of the transport hose can be up to 100 m or even more than 100 m.

In particular, the transport hose serves as a conduit extension between the supply device or the inlet device or mixing unit and a cleaning-side outlet opening.

The inlet device can include a mixing unit or consist of this. In particular, the mixing unit is characterised in that an explosive mixture is produced in this from the starting components which are led into the mixing unit.

The inlet device can include metering fittings. In particular, the metering fittings serve for introducing the explosive mixture or its starting components, which are provided from a metering unit, into the transport hose in particular in a controlled metered manner.

The inlet device can include metering fittings as well as a mixing unit or consist of these.

A container envelope, which can receive at least a part of the explosive mixture that flows out of the transport conduit via the outlet opening, can be arranged at the cleaning-side end of the transport conduit, which forms an outlet opening.

The quantity of the explosive mixture that is received by the container envelope is directed to the receiving volume of the container envelope.

The container envelope is flexible. The container envelope can be a sack (bag). The container envelope can be of paper, plastic or a combination of paper and plastic. The container envelope can be constructed in a single-layered or multi-layered manner.

Alternatively to the container envelope, the appliance can also be designed so that at least a part of the explosive mixture is introduced into the interior of the receptacle or facility via the outlet opening at the end of the transport conduit and a cloud of the explosive mixture is formed in the interior.

In particular, the cloud is characterised in that this in the interior is not delimited with respect to the surrounding atmosphere via physical means or via a barrier such as, e.g., a container envelope. In contrast, the edge region of the cloud is in direct contact with the surrounding atmosphere.

In particular, a connection component, which assumes a specific function, is arranged at the cleaning-side end of the transport hose. The connection component in particular forms a transport channel for the explosive mixture. This represents an extension of the transport channel of the transport hose. In particular, the connection component forms the cleaning-side outlet opening for the explosive mixture.

In particular, the connection component is of metal, such as steel.

The connection component according to an embodiment variant can be a guide tube. In particular, the guide tube is designed as a lance body.

In particular, the guide tube is designed as a hand part and serves for the manual placement of the container envelope or the cloud of explosive mixture in the inside of the container or the facility. On application of a container envelope, this in particular is fastened to the guide tube. The fastening can be direct or indirect.

In particular, the guide tube is used when the transport hose is not to be inserted into the interior of the receptacle or facility. The guide tube is accordingly designed to be inserted into the interior of the receptacle or facility to be cleaned, in particular to be introduced in a manual manner. Herein, the guide tube permits the alignment and the placing of the outlet opening towards the cleaning location.

The guide tube can have a length of 0.5 metres or more, or of 1 metre or more. In particular, the guide tube can have a length of 2 metres or more, and very particularly of 3 metres or more, such as, e.g., 4 metres.

In particular, the guide tube is releasably fastenable to the transport hose via a coupling such as a quick-coupling. This permits the simple and rapid exchange of guide tubes having a different length, during the cleaning. The user enjoys a high degree of flexibility during the cleaning on account of this, by way of him being able to fall back on a matching guide tube depending on the accessibility or distance of the locations which are to be cleaned, within the receptacle or the facility.

In particular, the guide tube is designed as a simple tube. This means that the guide tube is particularly designed in a single-walled manner. In particular, this means that the guide tube forms only a single channel. On account of this, the guide tube—even given a greater length—is very lightweight and therefore extremely manageable compared to conventional, multi-walled cleaning lances with an integrated cooling channel.

As already described further above, a cooling can be effected via a cooling medium that is fed via a cooling channel in the transport hose and is applied onto the guide tube from the outside or is fed into the transport channel of the guide tube.

However, the guide tube can also be constructed in a multi-walled manner and include an annular cooling channel which surrounds the transport channel. The annular cooling channel can be open at the cleaning side, so that the cooling medium can exit to the outside and, e.g., cool the container envelope.

In particular, the annular cooling channel of the guide tube can be connected to an annular cooling channel of the transport hose via a hose coupling, so that cooling medium can be transported from the cooling channel of the transport hose into the cooling channel of the guide tube.

The guide tube can alternatively also include a connection device such as a connection nozzle, for connecting a feed conduit for the cooling medium and for feeding the cooling medium into the cooling channel or into the transport channel. This means that the cooling medium is not fed via the transport hose but via a separate feed conduit directly to the guide tube.

A container connection element for connecting a container envelope can be formed in the cleaning-side end section of the guide tube.

According to another embodiment variant, a container connection element for connecting a container envelope is arranged at the cleaning-side end of the transport hose. The container connection element accordingly forms the outlet opening for the explosive mixture.

This embodiment variant is particularly applied when the transport hose is to be inserted into the interior of the receptacle or facility that is to be cleaned.

The container connection element can include a protective tube, a protective bell or a protective cage, for receiving the not yet expanded, i.e., pressed-together or folded together/collapsed container envelope. The same moreover also applies to the container connection element that is arranged on the guide tube.

A hose coupling, in particular quick-coupling, for the tool-free connection of a connection component such as, e.g., the aforementioned guide tube or the container connection element, onto the transport hose, can be provided at the cleaning-side end of the transport hose.

The connection component can also be a further hose, such as a positioning hose that (e.g., analogously to the guide tube or the lance body) is to be inserted into the receptacle or facility to be cleaned.

The connection component can also be a distribution unit, onto which in turn a plurality of outgoing positioning hoses are connectable, the positioning hoses to be introduced into the receptacle or facility to be cleaned and by way of which the position of the cleaning explosion or of the container envelopes in the interior of the receptacle or the facility can be fixed. The associated cleaning method is yet explained in more detail hereinafter.

In particular, the positioning hose is of plastic or includes a plastic, such as, e.g., PVC or PUR. The positioning hose, however, can also be of metal.

In particular, the hose coupling permits a tool-free connection by way of sticking the components together. A bayonet connection, which requires an insertion-rotation movement for connection, is also conceivable. Furthermore, screw connections are also possible.

In particular, the hose coupling also has the characteristic of the connection being able to be released again in a tool-free manner.

Furthermore, the hose coupling can be designed to lead a cooling medium from the cooling channel of the transport hose into the cooling channel of the connection component, in particular of a guide tube.

The transport conduit or the transport hose can also be connected to the supply device in a direct or indirect manner.

One can envisage the transport hose extending from the supply device, in particular from a metering unit or from an inlet device or mixing unit, up to the cleaning-side outlet opening or to a connection component that has an outlet opening and connects onto the transport hose.

The transport hose can be connected at the feed side to a component of the appliance, in particular to an inlet device or mixing unit, via a rotary joint. In particular, the rotary joint permits a rotation of the transport hose about its longitudinal axis. Torsion forces, which inevitably occur on moving the transport hose are avoided by way of this.

The rotary joint can be designed together with a coupling, in particular a quick-coupling.

The explosive mixture is created in the appliance, in particular from at least one first and second starting component.

In particular, the explosive mixture is gaseous. In particular, the starting components are likewise gaseous. However, the starting components can also be liquid, particularly if these are in pressure tanks under pressure. The liquid starting components, e.g., can get into gaseous condition, e.g., not until the creation of the explosive, gaseous mixture.

In particular, the explosive mixture includes a fuel. The fuel that represents the first starting component can be liquid or gaseous. In particular, the fuel can be a rapidly evaporating liquid. The fuel can be, e.g., from the group of combustible hydrocarbons such as acetylene, ethylene, methane, ethane, propane, petrol, oil etc.

The explosive mixture further in particular includes an oxidant such as, e.g., gaseous oxygen or an oxygen-containing gas, which represents the second starting component. This means that the explosive mixture is formed in particular from a first starting component, which is a fuel, and from a second starting component, which is an oxidant.

The starting components, which are mixed into an explosive mixture, can themselves already be mixtures such as gas mixtures or liquid mixtures.

In particular, a mixing unit or an inlet device with a mixing unit is arranged between the supply device and the transport hose, for creating the explosive mixture from at least two starting components, which are provided by the supply device.

The starting components are each transported from the supply device, in particular from a metering unit, to the inlet device or the mixing unit and fed into this, via a separate supply conduit such as hose conduit. The supply conduits are accordingly connected to the inlet device or mixing unit.

The supply conduits can have a length of up to 3 metres.

However, the supply conduits can also be designed longer and have lengths, e.g., of up to 15 or 30 metres. Such longer supply conduits are particularly suitable when the metering fittings together with the mixing unit are arranged in an inlet device, which in particular is not part of the supply device or metering unit.

In particular, the mixing unit forms a mixing zone, in which the starting components that are led into the mixing unit are mixed into the explosive mixture. The mixing unit forms respective feed channels for the starting components and these feed channels run out into the mixing zone.

The explosive mixture is subsequently fed from the mixing unit into the transport conduit and transported to a cleaning-side outlet opening of the transport conduit.

The inlet device or the mixing device can further be designed to feed a cooling medium into a cooling channel, in particular annular cooling channel of the transport conduit.

The cooling medium can basically be or include a gas, such as air, or a liquid, in particular water. In particular, the cooling medium is a liquid-gas mixture such as water-air mixture.

The cooling medium or the individual starting components of the cooling medium, such as water and air, e.g., compressed air, are each transported to the inlet device or mixing unit and fed into this, via a respective supply conduit such as hose conduits. The supply conduits are accordingly connected to the inlet device or mixing unit. The feed of the cooling medium such as water and/or air is controlled by the control device via respective fittings. These fittings can be arranged in the metering unit or the mixing unit or are arranged in the inlet device.

The cooling medium or the individual starting components of the cooling medium in particular can be likewise transported from the supply device to the inlet device or mixing unit via supply conduits.

Moreover, an ignition device for igniting the explosive mixture can be arranged in the inlet device or mixing unit. The component of the ignition device, which is effective with regard to the ignition, is arranged in the mixing zone or in the mixing unit subsequent to the mixing zone.

Amongst other things, the supply device includes a pressure container/tank, from which the starting components are transported to the inlet device or the mixing unit via the supply conduits.

According to a further development, the supply device includes a metering unit for the metered provision of the explosive mixture or its starting components.

Furthermore, the metering unit can also be designed for providing the cooling medium.

The already mentioned supply conduits accordingly lead from the metering unit to the inlet device or mixing unit.

In particular, the inlet device or mixing unit is arranged between the mentioned metering unit and the transport hose.

In particular, the metering unit is designed as a device, e.g., as a mobile device. The metering unit can accordingly be mounted on rollers or wheels. In particular, the starting components of the metering unit are accommodated in a housing.

The aforementioned pressure tanks are particularly designed as metering tanks, which provide the starting components in a fixed dosage, so that the starting components can be mixed in the inlet device or mixing unit in a stoichiometric ratio into the explosive mixture. In particular, the metering containers are part of the metering unit. This means that the metering containers are arranged in particular in the metering unit.

In turn, the metering containers are fed with the starting components from compressed gas bottles. Accordingly, the metering unit is connected to the compressed gas bottles via supply conduits.

The appliance also includes a control device for the control of the method. The control device controls the in particular metered introduction of the explosive mixture or its starting components into the transport conduit or into the inlet device or mixing unit. The control device moreover also controls the ignition device, via which the explosion is triggered. The control device also controls the feed of the cooling medium into the transport conduit or inlet device or mixing unit.

In particular, the control device is likewise arranged in the metering unit. The control device can include an input unit. The input unit can be arranged in the metering unit.

Additionally or alternatively to an input unit, which is arranged in the metering unit, an input unit, which is mobile compared to the metering unit, is connected by cable or in a cable-free manner and which permits inputs remotely from the metering unit can also be provided.

The input unit can include operating buttons, an input keyboard or a touch-sensitive screen (touchscreen). The input unit can further also include output means such as a screen or display lights.

As already mentioned, the appliance in particular includes metering fittings for the metered introduction of the gaseous mixture or the starting components. Each metering fitting is assigned to a starting component. The metering fitting in particular includes a valve for the controlled flow of the starting components.

The metering fittings can be arranged in the metering unit. The metering fittings, however, can also be arranged on the inlet device or mixing unit.

Basically, it is also possible for the inlet device or mixing unit to be integrated into the metering unit. In particular, the metering fittings as well as the mixing unit can be integrated into the metering unit. Accordingly, the transport hose can also be connected (directly) onto the metering unit.

The cleaning method of the present invention is based on the principle of bringing an explosive mixture into the proximity of a cleaning location by way of the transport conduit, in order to cause the explosive mixture to explode as close as possible to the cleaning location.

The cleaning method includes the steps:
providing a gaseous, explosive mixture in the transport conduit, and
transporting the gaseous, explosive mixture to a cleaning-side outlet opening of the transport conduit;
controlled ignition of the explosive mixture by way of an ignition device, wherein the explosive mixture is made to explode.

For this, the starting components are led from the supply device or from the metering unit in particular into an inlet device or a mixing unit via the supply conduits and are mixed with one another into an explosive mixture in the inlet device or the mixing unit.

The starting components, which are under overpressure in the pressure tanks, on introduction into the inlet device or the mixing unit get into the lower ambient pressure, by which means these obtain the necessary kinetic energy for their transport through the supply conduit or for the transport of the explosive mixture through the transport conduit.

The mixing unit forms a mixing zone, in which the starting components are mixed with one another into the explosive mixture. The explosive mixture is led from the mixing zone into the transport conduit and thus into the transport hose and is transported in this conduit or in this hose further in the direction of the outlet opening.

In particular, a container envelope for receiving an explosive mixture is provided in an embodiment of the method.

In particular, the container envelope is filled with the explosive gas mixture that exits from the outlet opening of the transport conduit.

For this, a container envelope is attached to the cleaning-side outlet opening of the transport conduit before providing the explosive mixture in the transport conduit.

According to a method variant, a cloud of the explosive mixture is formed in the interior of the receptacle or facility that is to be cleaned, by the explosive mixture that exits from the outlet opening of the transport conduit.

According to a particular variant, the method includes the following further steps:
positioning several positioning hoses each with a container envelope that is attached on the positioning hose, at different locations in the interior of the receptacle or facility to be cleaned;
parallel or sequential connection of the positioning hoses directly or indirectly onto the transport conduit;
charging the connected positioning hoses in a sequential sequence with gaseous, explosive mixture and supplying the container envelopes with explosive mixture and, by way of this, producing several cleaning explosions in a sequential sequence.

In particular, the explosive mixture is ignited via the ignition device for triggering the explosion. In particular, the ignition is effected into the mixing zone or into a zone of the mixing unit which connects thereto.

The ignition can be effected directly subsequently to a closure of the metering fittings, i.e., directly after completion of the introduction of the initial components into the mixing unit. This is particularly the case when a cloud of explosive mixture is to be produced in the interior of the receptacle or the facility.

One can also envisage the ignition being triggered in a delayed manner and, e.g., not being effected until the overpressure in the mixing unit subsequently to the introduction of the starting components has sunk to below 0.5 bar, in particular to below 0.25 bar.

The explosion, which is initiated by the ignition, propagates from the mixing unit through the transport conduit up to the outlet opening and also triggers the explosion of the explosive gas mixture in the container envelope or in the cloud, subsequent to the outlet opening. In the case of a container envelope, this is destroyed with the explosion.

The impact of the explosion and the surface, e.g., a container wall or tube wall that is brought into oscillation by the shock waves effect the blasting-away of the wall caking and slag and, thus, the cleaning of the surface.

The strength of the explosion, which is necessary for a cleaning and, thus, the quantity of the applied starting components of the mixture, is directed to the type of fouling and to the size and type of the fouled receptacle. The metering and strength of the explosion can and are preferably selected such that no damage to the installations occurs. The possibility of the optimal metering of the applied substances on the one hand reduces the cleaning costs and on the other hand the danger and damage risk to the installation and persons.

Basically, the explosive mixture can also be provided directly by the supply device, e.g., from a pressure tank and led into the transport conduit, whilst forgoing a mixing unit. However, as a rule, this alternative solution is not considered for reasons of safety technology and for practical reasons.

The cleaning cycle described above can be divided into different operating cycles. In a first cycle, the metering fitting(s) is or are opened and the starting components, e.g., from the pressure tanks, are led into the mixing unit under pressure, are mixed with one another there and as an explosive mixture led further via the transport conduit to the outlet opening.

After leading the predefined quantity of starting components into the inlet device or mixing unit, the metering fittings are closed again. Directly subsequent to this, in a further cycle, the ignition is activated and the formed total volume of explosive mixture is made to explode.

An explosive mixture can be produced afresh subsequently to the explosion by way of a renewed opening of the metering fittings in a subsequent cleaning cycle.

Usefully, the transport channel is purged with a purging gas subsequent to the explosion and before a new cleaning cycle. The purging of the transport channel serves for eliminating residues such as water vapour and combustion gases out of the transport channel. The purging can be effected, e.g., with air or oxygen.

The purging of the transport channel can also include a cooling. For this, in particular a liquid cooling medium such as water can additionally be fed into the transport channel of the transport hose.

In particular, the cooling medium is fed into the transport channel via a suitable inlet such as an inlet nozzle, on the inlet device or mixing unit. However, the cooling medium can also be fed into the transport channel via an inlet, such as an inlet nozzle, on the transport hose.

The inlet for the cooling medium in particular is arranged downstream subsequent to the ignition device. An undesired humidification of the ignition device is prevented by way of this.

The feeding of a liquid cooling medium into the transport channel is particularly suitable if the hose or the wall, which forms the transport channel, is impermeable to liquids such as water and in particular forms a smooth inner wall, as is the case, e.g., with a hose of plastic such as polytetrafluoroethylene (PTFE).

In particular, the feeding of the liquid cooling medium into the transport channel serves for the protection of the hose from an excessive thermal loading, particularly if this consists of plastic.

Thus, for example, liquid cooling medium can be fed into the transport channel directly after the ignition, for the purpose of cooling the hose. The quantity of fed cooling medium is kept low, since basically as little as possible humidity/moisture is to be brought into the system. The fed liquid cooling medium in particular evaporates and on account of this takes heat from the surroundings. Liquid cooling medium can therefore be fed in only for a time of 0.1 to 1 seconds for example, in particular 0.1 seconds.

The service life of the plastic hose is significantly extended in this manner.

The feeding of the liquid cooling medium into the transport channel can also be applied in the case of undesirable back-ignitions which however are not always avoidable. Such back-ignitions are detected at an early stage, for example with the sensors, which are described hereinafter. Here too, the feeding of a liquid cooling medium serves for the direct cooling of the hose, which forms the transport channel, and thus for its protection from an excessive thermal loading.

The feeding of the liquid cooling medium into the transport channel can be effected before and/or during the purging of the transport channel with a purging gas. The feeding of a liquid cooling medium into the transport channel can otherwise also be effected independently of the purging of the transport channel with a purging gas.

A temperature sensor can be arranged in the inlet device or mixing unit for monitoring a cleaning cycle. In particular, the temperature sensor is arranged in the mixing zone. The temperature sensor detects temperature values in the inlet device or mixing unit or in the mixing zone.

A pressure sensor can be arranged in the inlet device or mixing unit—likewise for monitoring a cleaning cycle. In particular, the pressure sensor is arranged in the feed channel of the first starting component (fuel) or of the second starting component (oxidant), upstream of the mixing zone in the flow direction. The pressure sensor detects pressure values in the feed channel.

In particular, the two sensors serve for the early detection of back-ignitions. Back-ignitions occur when the explosive mixture ignites on its own accord in the region of the outlet opening or in the transport conduit. The explosive mixture is consequently ignited from the outlet opening right back into the mixing zone. Correspondingly high pressures and temperatures can occur in the mixing unit due to the back-ignition and these are detected by the pressure sensor and the temperature sensor respectively.

A back-ignition can already be effected during the introduction of the starting components into the inlet device or mixing unit. Given a back-ignition, it is important to immediately close the metering fittings or the associated valves, in order to avoid possible damage in the inlet device or the mixing device or the supply device.

The pressure senor or the temperature sensor is coupled to the control device. The control device in particular includes a memory-programmable control (MPC control). The control device evaluates the sensor data and on ascertaining a back-ignition initiates the corresponding steps, such as closing the metering fittings and terminating the current cleaning cycle.

So-called check valves can be arranged in the inlet device or mixing device downstream of the metering fittings for the purpose of avoiding damage to the fittings. These check valves ensure that a pressure shock, which is triggered by a back-ignition, does not act upon the metering fitting and damages this.

The appliance can furthermore include introduction aids, which simplify or even permit the introduction of the transport hose into the interior of the receptacle or of the facility in the first place.

Since the transport hose has no intrinsic stability transverse to its longitudinal direction, its introduction into the interior of the receptacle or facility is rendered more difficult. The transport hose under certain circumstances must therefore be introduced or led by hand by personnel who are stationed in the interior of the receptacle or facility. This, however, is not possible or desirable in every case.

The transport hose must therefore, for example, be led through difficultly accessible intermediate spaces, in order to bring this into the interior which is to be cleaned. Since the through-openings can be arranged offset to one another, a leading of the transport hose through the intermediate space in a straight line is practically impossible.

For this, the appliance can now include a flex-tube in a first embodiment of an introduction aid, by way of which flex-tube the transport hose can be led through passages in the interior of the receptacle or facility to be cleaned. For this, the flex-tube forms an in particular closed guide channel. The transport hose is led through this guide channel.

In particular, the flex-tube is characterised in that this, although being flexible, is however designed in a semi-rigid manner. The flex-tube can be bent out of its longitudinal axis by way of this, but remains in its bent position even under the effect of gravitational force. In particular, the flex-tube is of metal such as steel. The flex-tube can, e.g., be a spiralled metal hose.

The flex-tube can be laid once by the operating personnel and accordingly be bent in a manner corresponding to the course of the introduction path. Once the flex-tube has been laid once for example bridges an intermediate space, then the transport hose can be led through the flex tube and withdrawn again arbitrarily frequently. This is particularly important since given the application of container envelopes, the transport hose must be withdrawn from the interior and introduced into this again for each cleaning procedure for the purpose of fastening a new container envelope.

Moreover, it can be necessary to introduce the transport hose into the interior of the receptacle or of the facility from the side to a different extent. This is likewise not possible without an introduction aid, since the transport hose without any guidance is deflected out of its lateral introduction direction on account of gravitational force.

For this, the appliance in a second embodiment of an introduction aid can include an introduction tube, by way of which the transport hose can be introduced via an opening, into the interior of the receptacle or facility to be cleaned. For this, the introduction tube in particular forms a closed guide channel. The introduction depth of the transport hose can be determined by the insert position of the introduction tube.

In particular, the introduction tube is designed in a straight manner. In particular, the introduction tube is of metal, such as steel.

The introduction tube at its cleaning-side opening can includes a downwardly directed arcuate rest for the transport hose. The arcuate rest serves as an abrupt-bend (kink) protection and is to prevent an abrupt bending (kinking) of the transport hose to the bottom.

The flex-tube and the introduction tube can include a cooling device for cooling the transport hose in the inside of the flex-tube or of the introduction tube. The flex-tube or the introduction tube can therefore be designed in a double-walled manner and include an annular cooling channel that surrounds the guide channel. A cooling medium such as water is fed into the cooling channel.

The flex-tube or the introduction tube can include a connection device such as a connection nozzle, for the connection of a feed conduit for the cooling medium and for feeding the cooling medium into the cooling channel.

A pull cable system, by way of which the transport hose with the container envelope or with the outlet opening can be vertically pulled up and/or lowered in the interior, can be provided for positioning the transport hose with the container envelope in the interior of the receptacle or facility to be cleaned.

The pull cable system can also be designed such that the transport hose with the container envelope or with the outlet opening can be horizontally displaced in the interior.

The pull cable system in particular includes one or more flexible pull means as well as one or more deflection rollers. The flexible pull means can be a cable, a cord, a belt, a strap, a cable or a chain.

The pull cable system can be designed as a simple pull cable or include such.

The pull cable system can also be designed as a pulley or include such.

A pull cable system, which in particular is designed as a pulley, can also be used to bring alterative cleaning agent, such as explosives, into the interior of the receptacle or facility and to position it therein.

The appliance according to the invention permits large reaches, which have hitherto not been reached, thanks to the transport hose, without thereby having to repeatedly displace the supply device or the metering unit.

The flexible transport hose can be led into the inside of the receptacle or of the facility that is to be cleaned, via complex introduction paths, which is not possible with conventional cleaning lances.

Thanks to the particular construction of the transport hose, this despite its flexibility is very robust and, depending on the embodiment variant, is pressure-resistant as well as heat-resistant. The smooth inner wall of the transport channel furthermore permits the transport of the explosive mixture over large distances without a compromising pressure loss.

The handling is significantly simplified due to the fact that in contrast to conventional cleaning lances, the inlet device or the mixing unit is no longer arranged on a hand part such as a lance body, but in contrast upstream of the transport hose on the flow direction. A lance body, which is without an inlet device or mixing unit and which is designed as a hand part, therefore weighs significantly less than a conventional cleaning lance with an inlet device or mixing unit.

The inlet device or the mixing unit, just as the supply device or metering unit, according to the invention no longer needs to be constantly displaced.

The arrangement of the inlet device or mixing unit remotely from the hand part further increases the safety, since on operation of the appliance the operating personnel no longer need to be directly at the inlet device or the mixing unit. Concerning this, it should be noted that the inlet device or the mixing unit, considered over the complete system, are most prone to malfunctioning which is of concern to safety, such as occur for example with back-ignitions.

BRIEF DESCRIPTION OF THE DRAWINGS

The subject-matter of the invention is hereinafter described in more detail way of preferred embodiment examples which are represented in the accompanying drawings. In each case in a schematic manner are shown in:

FIG. 1b: a cross-sectional view of the corrugated hose of a transport hose according to FIG. 1a;

FIG. 1c: a detailed view of a transport hose according to FIG. 1a;

FIG. 3a: a cross-section view of a further embodiment of a transport hose with a cooling channel, according to the invention;

FIG. 3b: a lateral view of the transport hose according to FIG. 3a;

FIG. 5a: the cleaning-side region of the cleaning appliance according to FIG. 4 according to a first configuration:

FIG. 5b: the cleaning-side region of the cleaning appliance according to FIG. 4 according to a second configuration;

FIG. 6: an embodiment variant of the cleaning appliance according to the invention;

FIG. 8: a further embodiment variant of the cleaning appliance according to the invention;

FIG. 9a: a further embodiment variant of a cleaning appliance according to the invention;

FIG. 9b: a modification of the embodiment variant according to FIG. 9a;

FIG. 10a: a further embodiment variant of the cleaning appliance according to the invention;

FIG. 10b: a detailed view of the cleaning appliance according to FIG. 10a from the region of the flex-tube;

FIG. 13: a cross-sectional view of a further embodiment variant of a cleaning appliance according to the invention;

FIG. 14a: a further embodiment variant of a cleaning appliance according to the invention;

FIG. 14b: a cross-sectional view of the distribution unit according to the embodiment variant according to FIG. 14a.

DETAILED DESCRIPTION OF THE INVENTION

Figure 1A:
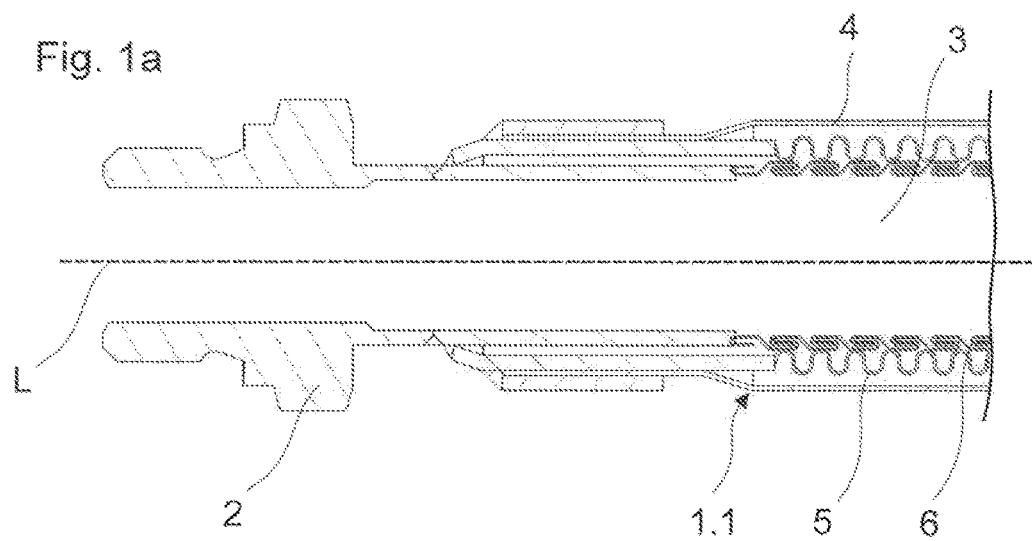
FIG. 1a: a cross-sectional view of a transport hose according to the invention.

Basically, the parts that are the same in the figures are provided with the same reference numerals. Certain features are not represented in the figures for a better understanding of the invention. The described embodiment examples are exemplary of the subject-matter of the invention and have no limiting effect.

Figure 1B:
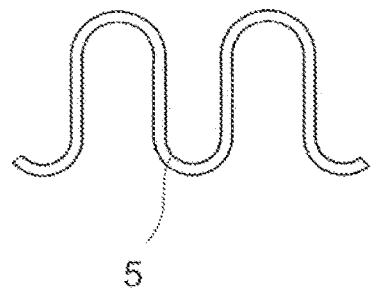
Figure 1C:
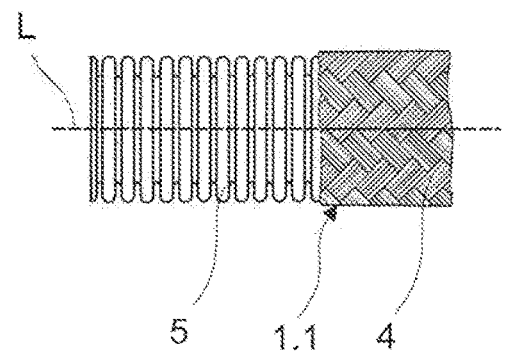

The transport hose 1.1, which is represented in FIG. 1a to 1c, includes an inner-lying stripwound hose 6 with a fold profile of metal. The stripwound hose 6 forms the transport channel 3 for the explosive mixture. The stripwound hose 6 forms a smooth inner wall that is only interrupted by a spirally running groove, along which the fold profiles mesh into one another. The loose insertion of the fold profiles into one another gives the stripwound hose 6 the necessary flexibility. However, the stripwound hose 6 is also not gas-tight due to this.

A corrugated hose 5 of metal, which (concentrically) surrounds the stripwound hose 6, ensures the necessary gas-sealedness. The corrugated design of the corrugated hose 5 provides this with the necessary flexibility.

A hose braiding 4 of metal surrounds the corrugated hose 5 for accommodating radially outwardly acting pressure forces as arise during the ignition of the explosive mixture. Apart from radial pressure forces, the hose braiding 4 also accommodates axially acting, i.e., along the longitudinal axis L, tensile forces. The hose braiding 4 prevents the stripwound hose 6 or the corrugated hose 5 from being deformed by the mentioned pressure forces and tensile forces.

According to FIG. 1a, the transport hose 1.1 is provided at the cleaning side with a hose coupling 2, which permits the tool-free connection of connection components onto the transport hose 1.1.

The described transport hose 1.1 represents a basic embodiment that includes no separate cooling channel and therefore can only be cooled from the inside by way of leading a cooling medium into the transport channel 3.

Since the transport hose 1.1 consists completely of metal, this is accordingly heat resistant or thermally durable and furthermore is extremely robust with respect to harsh environmental conditions as prevail in the interior of the receptacle or facility which is to be cleaned, particularly if the cleaning is effected during the operation of the facility.

Figure 2:
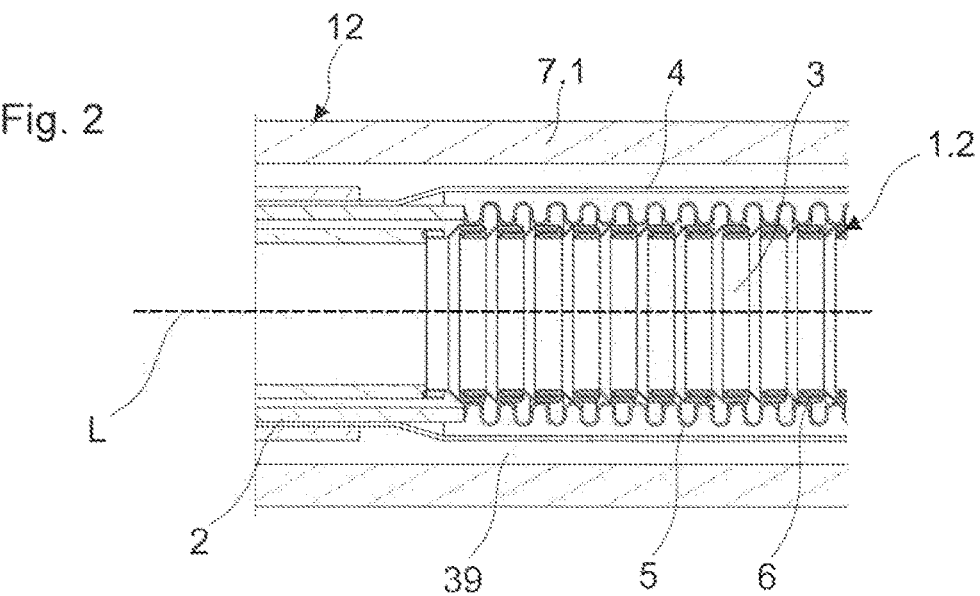
FIG. 2: a cross-sectional view of a further embodiment of a transport hose with a cooling channel, according to the invention.

FIG. 2 shows an embodiment with a cooling channel 39, the embodiment being based on the basic embodiment according to FIGS. 1a-1c. The transport hose 1.2, analogously to the basic embodiment according to FIG. 1a-1c, includes an inner-lying stripwound hose 6, a corrugated hose 5 that (concentrically) surrounds the stripwound hose 6, as well as a hose braiding 4 which (concentrically) surrounds the corrugated hose 5. The description concerning the FIGS. 1a-1c is referred to for further details.

In contrast to the basic embodiment according to FIG. 1a-1c, the transport hose 1.2 includes a further, outer-lying hose 7.1 of ethylene propylene diene monomer rubber (EPDM) that (concentrically) surrounds the hose braiding 4. The mentioned hose 7.1 is liquid-tight.

Since the outer-lying hose of EPDM has elastic characteristics inherent of the material and is flexible on account of this, this does not need to have any special outer geometry in contrast to the stripwound hose or corrugated hose.

An annular cooling channel 39 is formed between the outer-lying hose 7.1 and the hose braiding 4, in which cooling channel a cooling medium 9 can be transported from the feed-side end of the transport hose 1.2 onto its cleaning-side end.

A mixing unit 12, which likewise forms a transport channel as well as a cooling channel that are connected to the transport channel 3 and to the cooling channel 39 of the transport hose 1.2, connects onto the transport hose 1.2 at the supply side (only indicated schematically).

Since the outer-lying hose 7.1 of EPDM is only heat resistant or thermally durable to a limited extent, this embodiment of a transport hose 1.2 is also not suitable for introduction into a the hot interior of the receptacle or facility to be cleaned, particularly when this is in operation.

The mentioned transport hose 1.2 is particularly used for application as a conduit extension outside the interior which is to be cleaned, or for applications in suitably cooled interiors of receptacles or facilities that are to be cleaned.

Figure 3:
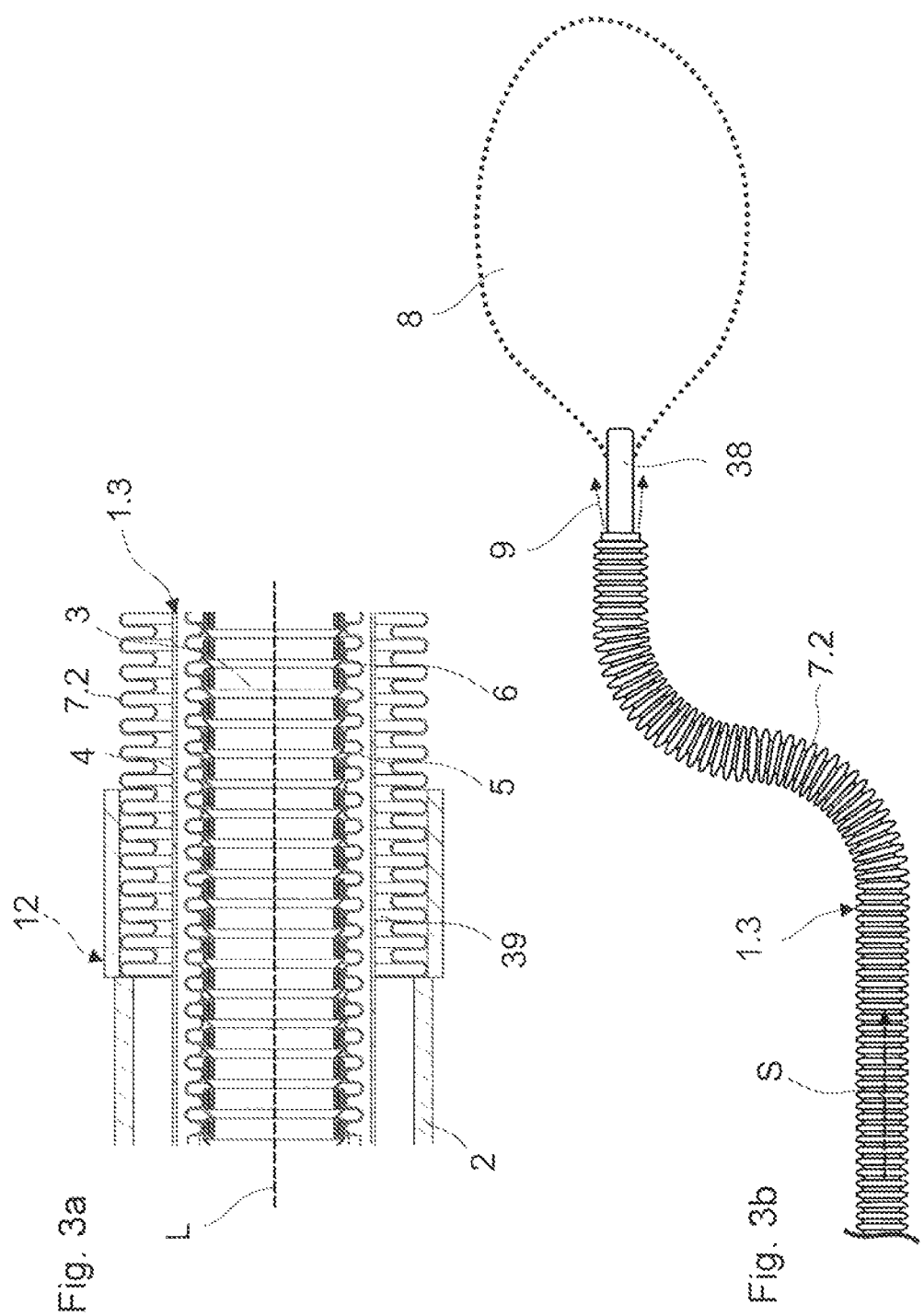

A further embodiment of a transport hose 1.3, which is likewise based on the basic embodiment according to FIG. 1a-1c and forms a cooling channel 39, is represented in the FIGS. 3a-3b.

The embodiment according to FIG. 3a-3b differs from the embodiment according to FIG. 2 in that the outer-lying hose 7.2 does not consist of plastic but is a corrugated hose of metal. The outer-lying corrugated hose 7.2 can be constructed in the same manner as the corrugated hose 5, which surrounds the stripwound hose 6 and ensures the necessary gas-sealedness. The corrugated hose 7.2 is accordingly liquid-tight.

Accordingly, an annular cooling channel 39 is likewise formed between the outer-lying corrugated hose 7.2 and the hose braiding 4.

Since this transport hose 1.3 with the cooling channel 39 consists completely of metal, this is accordingly heat-resistant and thermally durable and can be applied for hot applications in hot interiors of receptacles or facilities which are to be cleaned, the facilities, e.g., being in operation.

A mixing device 12, which likewise forms a transport channel as well as a cooling channel that are connected to the transport channel 3 and the cooling channel 39 of the transport hose 1.3, connects onto the transport hose 1.3 at the supply side (only indicated schematically).

A construction as is typical for a (cooled) transport hose 1.3, which is to be introduced into the interior of a receptacle or container to be cleaned, is represented in FIG. 3b.

A container connection element 38, on which a container envelope 8 is attached connects to the cleaning-side end of the transport hose 1.3. The container connection element 38 includes a transport channel with a cleaning-side outlet opening, via which the explosive mixture is led from the transport hose 1.3 into the container envelope 8.

The transport hose 1.3 together with the container envelope 8 is introduced into the interior of a receptacle or container to be cleaned. However, the container envelope 8 is not filled with the explosive mixture until in the interior of the receptacle or container to be cleaned, the mixture being fed through the transport channel 3 in the flow direction S.

The cooling channel 39 at the cleaning-side end of the transport hose 1.3 includes an exit opening, from which the cooling medium 9 exits and cools a connection component such as container connection element 38 or the container envelope 8.

Figure 4:
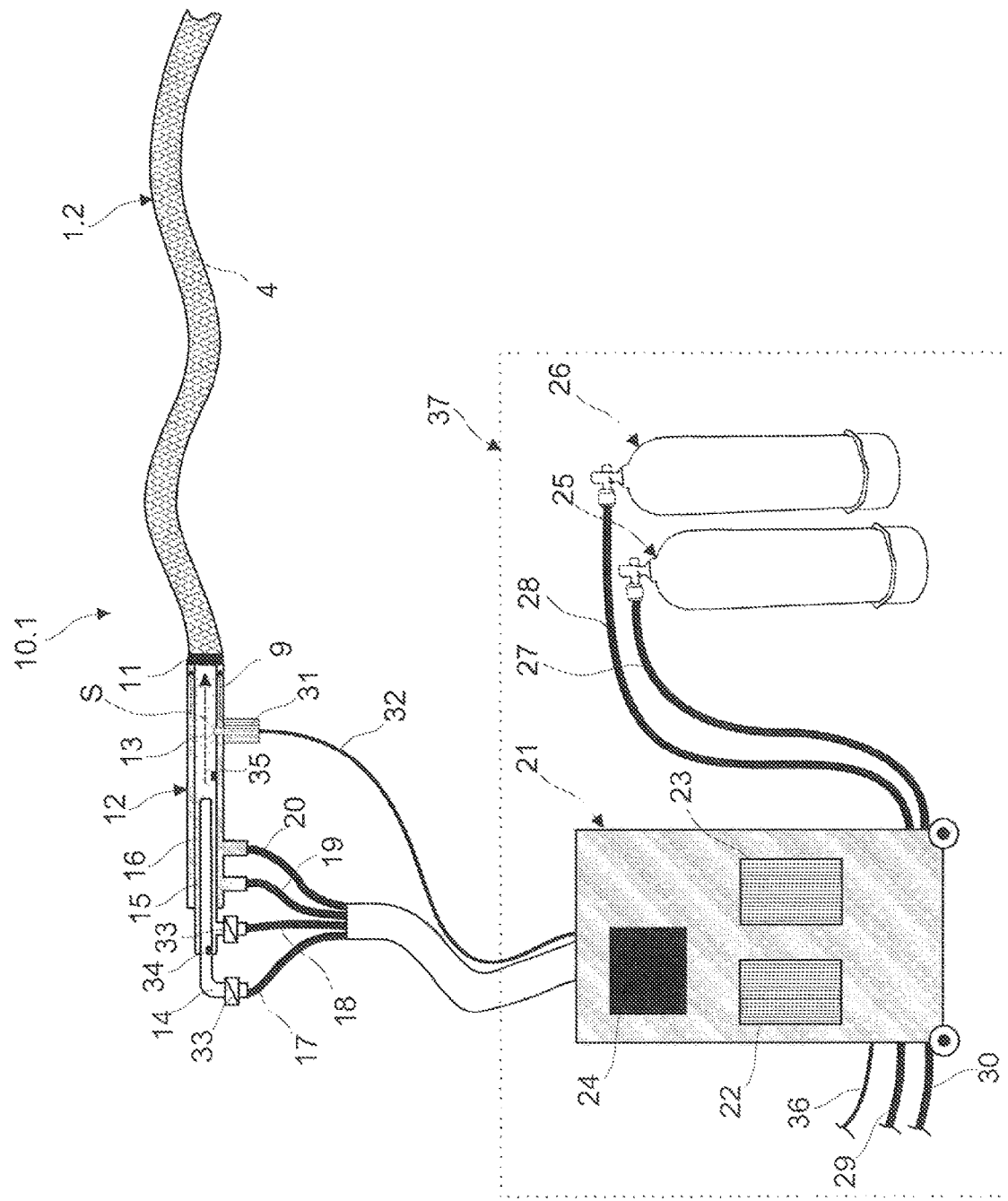
FIG. 4: the feed-side region of a cleaning appliance according to the invention.

FIG. 4 shows the appliance 10.1 according to the invention, from the region of the supply device 37. The supply device 37 includes a metering unit 21 with metering containers 22, 23 for the supply of a mixing unit 12, which is connected downstream onto the metering unit 21, with a first and a second starting component for creating the explosive mixture. The first and the second starting component are fed to the mixing unit 12 via supply conduits 17, 18. The metering containers 22, 23 in turn are supplied with the respective starting components from gas bottles 25, 26, which are not integrated in the metering unit 21, via supply conduits 27, 28.

The metering unit 21 is designed as a mobile device on rollers, which is to simplify the handling of the appliance 10.1 in a facility.

Furthermore, the metering unit 21 is externally supplied with water as well as compressed air via respective supply conduits 29, 30. These component are necessary for creating the cooling medium.

The metering unit furthermore also includes a connection lead 36 to an external electrically source for the supply of electricity.

Furthermore, a control device 24 for the control of the cleaning method is arranged in the metering unit 21. Amongst other things, the introduction of the starting components into the mixing unit 12 is controlled via the control device 24.

A mixing unit 12 connects downstream onto the metering unit 21. A first component in the form of a gaseous fuel, such as ethylene is introduced into a first feed channel 14 of the mixing unit 12 via a first supply conduit 17.

A second component in the form of a gaseous oxidant such as oxygen is introduced into a second feed channel 15 of the mixing unit 12 via a second supply conduit 18. The two feed channels 14, 15 run out in a mixing zone 13, in which the two components are mixed into an explosive, gaseous mixture.

A transport hose 1.2, which is connected onto the mixing unit 12 via a rotary joint 11, is connected downstream onto the mixing unit 12. The explosive mixture is led from the mixing zone 13 via a transport channel into the transport channel 3 of the transport hose 1.2 which connects thereto.

In the present embodiment example, the second feed channel 15 is laid annularly around the first feed channel 14. However, this arrangement is not absolutely necessary.

The mixing unit 12 moreover includes an ignition device 31 with a component that is effective in ignition, the component being arranged in the mixing zone or subsequently to the mixing zone. The ignition device 31 is connected to the metering unit 21 or to the associated control device 24 via a connection lead 32. The ignition device 21 or the ignition procedure is controlled via the control device 24.

The mixing unit 12 furthermore includes a cooling channel 16 that is laid annularly around the mixing zone 13 or around the transport channel of the mixing unit 12 which connects thereto.

The cooling channel 16 is connected to the cooling channel 39 of the transport hose 1.2 via the rotary joint connection 11.

The cooling medium 9 consists of water and air, which are each fed into the cooling channel 16 from the metering unit 21 via separate supply conduits 19, 20. The feed of the cooling medium 9 is likewise controlled via the control device 24.

Transport hoses, which include no cooling channel 39 for introducing a cooling medium 9, can also be connected, even if the mixing unit 12 includes a cooling device. Simply no cooling medium 9 is fed into the mixing unit 12 in this case.

A check valve 33, which is to prevent the introduction of pressure shocks upstream from the mixing unit 12 into the supply conduits 17, 18 of the starting components, is each arranged on the two feed channels 14, 15.

Furthermore, a temperatures sensor 35, which is to detect peculiarities in the temperature course during a cleaning cycle, is arranged in the mixing zone.

A pressure sensor 34 is arranged in the first feed channel 14 upstream of the mixing zone 13 in the flow direction S for the same propose. This is to detect peculiarities in the pressure course during a cleaning cycle. Such peculiarities occur for example in the case of so-called back-ignitions.

Since pressure sensors are extremely sensitive, this is arranged in the feed conduit 14 where any occurring pressure shocks are weakened compared to the mixing zone 13 and cannot therefore damage the pressure sensor 34.

FIGS. 5*a* and 5*b* show the appliance 10.1 according to the invention from the cleaning-side region, in two configurations.

The appliance 10.1 in both cases includes a transport hose 1.2, which is connected at the supply side to a mixing unit 12 (see FIG. 4).

According to a first configuration according to FIG. 5*a*, a container connection element 38, e.g., in the form of a connection nozzle, on which a container envelope 8 is fastened connects onto the cleaning-side end of the transport hose 1.2. This configuration was already described within the framework of FIG. 3*b*. The respective description is referred to.

According to this configuration, the transport hose 1.2 together with the container envelope 8 is introduced into the interior of a receptacle or facility which is to be cleaned. The container envelope 8, however, is not filled with the explosive mixture that is fed through the transport channel 3 in the flow direction S, until in the interior.

According to a second configuration according to FIG. 5*b*, a guide tube 42, which is designed as a hand part, connects onto the cleaning-side end of the transport hose 1.2.

The guide tube 42 includes a transport channel, via which the explosive mixture is led from the transport hose 1.3 into the container envelope 8. The guide tube 42 includes a container connection element 43 at the cleaning-side end, the element including an outlet opening and on which a container envelope 8 is fastened.

According to this configuration, it is only the guide tube 42 with the container envelope 8, but not the transport hose 1.2 that is introduced into the interior of a receptacle or facility to be cleaned. However, the container envelope 8 is not filled with the explosive mixture that is fed through the transport channel 3 in the flow direction S, until in the interior.

The guide tube 42 and the container connection element 38 are connected to the transport hose 1.2 via a hose coupling 44 in each of the two configurations. A guide tube 42 or a container connection element 38 can be fastened to the hose end in this manner.

The cooling channel 39 of the transport hose 1.2 is connected to the transport channel of the guide tube 42 via a hose coupling, at the cleaning-side end of the transport hose 1.3. The cooling medium is, accordingly, led from the transport tube 1.2 through the guide tube 42 and leaves this via a cleaning-side exit opening. The exiting cooling medium 9 cools the container envelope 8 and possibly the container connection element 43 on the guide tube 42.

If the appliance 10.1, which is described in the FIGS. 4 and 5a-b, is operated with a cooling medium 9, then a transport hose 1.2 according to FIG. 2 or a transport hose 1.3 according to FIG. 3a-3b can be used for this.

However, the appliance 10.1 can also be operated without a cooling medium 9, so that a transport hose 1.1 according to FIG. 1a-1c can be used.

FIG. 6 shows an embodiment variant of an appliance 10.2 according to the invention. The appliance 10.2 has the feed-side construction of the appliance 10.1 according to FIG. 4 as well as the cleaning-side construction of the appliance according to FIG. 5b. A repetition of the description of the appliance is forgone here, but rather the associated description parts concerning FIGS. 4 and 5b are referred to.

As is derived from FIG. 6, only a guide tube 42, which is designed as a hand part, together with a container envelope 8, is introduced into the interior 52.1 for cleaning the interior 52.1 of the facility 51.1.

The transport hose 1.1, which has the function of a conduit extension, is arranged outside the interior to be cleaned and is to bridge the distance between the metering unit 21 or the mixing unit 12 and the working opening in the facility. Accordingly, the transport hose 1.1 does not need to be cooled. Despite this, apart from the uncooled transport hose 1.1 according to FIGS. 1a-1c, a cooled transport hose 1.2, 1.3 can also be used, in particular for cooling the container envelope 8 given hot applications, as is described in FIGS. 2 and 3a-3b. Since the handling of the cooled transport hose 1.2 according to FIG. 2 is simpler compared to the cooled transport hose 1.3 according to FIG. 3a-3b, it is the transport hose 1.2 according to FIG. 2 that tends to be used in this configuration.

Figure 7:
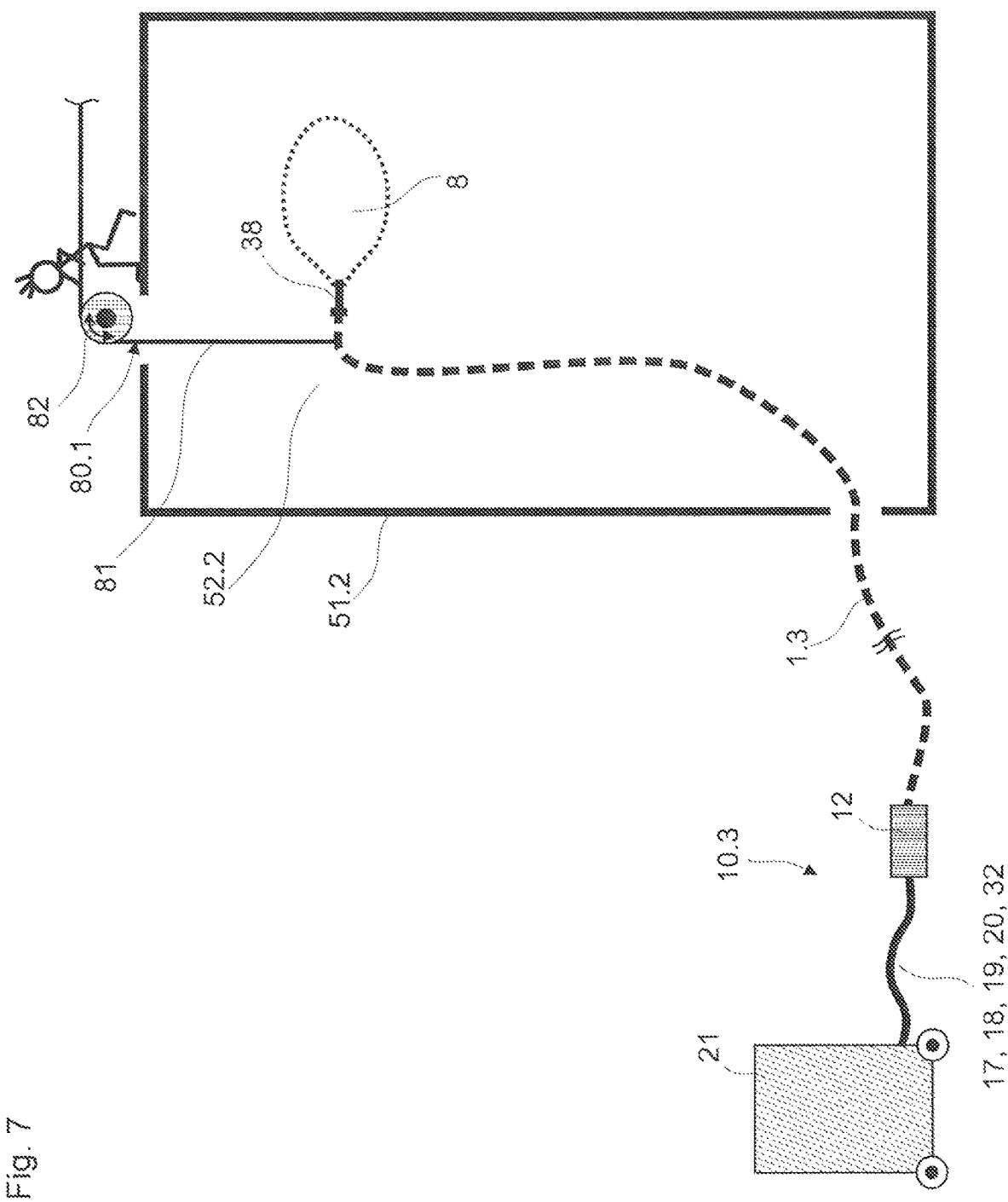
FIG. 7: a further embodiment variant of the cleaning appliance according to the invention.

FIG. 7 shows a further embodiment variant of an appliance 10.3 according to the invention. The appliance 10.3 has the feed-side construction of the appliance 10.1 according to FIG. 4 as well as the cleaning-side construction of the appliance according to FIG. 5a. Here, a repetition of the description of the appliance is foregone and instead the associated description parts concerning FIGS. 4 and 5a are referred to.

As can be derived from FIG. 7, the transport hose 1.3 together with a container envelope 8 is introduced into the interior 52.2 that is to be cleaned, for cleaning the interior 52.2. The transport hose 1.3 is designed according to FIGS. 3a-3b and includes a cooling. Here, a repetition of the description of the transport hose 1.3 is foregone and instead the associated description parts concerning FIG. 3a-3b are referred to.

If, however, the interior 52.2 to be cleaned has cooled down because of the facility not being in operation due to the cleaning, then an uncooled transport hose 1.1 according to the FIGS. 1a-1c can also be used apart from the cooled transport hose 1.3 according to FIGS. 3a-3b. Furthermore, in this case a transport hose 2 according to FIG. 2 can likewise be applied. This also applies to the embodiment examples according to FIG. 8, 9, 10a-10b and 11.

The appliance 10.3 differs from the appliance 10.2 according to FIG. 6 by the absent hand part in the form of a guide tube 42, by way of which the container envelope 8 can be positioned in the interior 52.2.

Instead, a pull cable system 80.1 with a pull cable 81 and a deflection roller 82 are provided, by way of which system the transport hose with the container envelope 8 can be pulled up or lowered from above into the position to be cleaned, from outside the facility 51.2. The deflection roller is arranged outside the facility 51.2 and is arranged above the interior 52.2 to be cleaned. The pull cable 81 is led through an opening above the interior 52.2 to be cleaned, into this interior 52.2.

FIG. 8 shows a further embodiment variant of an appliance 10.4 according to the invention. The appliance 10.4 differs from the appliance 10.3 according to FIG. 7 merely in the construction of the pull cable system 80.2.

The pull cable system 80.2 includes a deflection roller 82, which is arranged in the roof region of the interior 52.3, as well as a deflection roller 82, which is arranged on the base of the interior 52.3, and these permit the pull cable 81 to be led through an opening in the lower region of the interior 52.2. The transport hose 1.3 with the container envelope 8 (not yet expanded here) can be pulled up and lowered in the interior 52.2 through the lower opening by way of the pull cable 81, which is deflected via the two deflection rollers 82, thanks to these deflection rollers 82.

FIG. 9a shows a further embodiment variant of an appliance 10.5 according to the invention. The appliance 10.5 likewise differs from the appliance 10.3 and 10.4 according to FIGS. 7 and 8 merely in the construction of the pull cable system 80.3.

The basic construction of the pull cable system 80.3 corresponds to the pull cable system 80.2 according to FIG. 8. Here, in contrast to FIG. 8, the deflection roller 82 which is arranged in the roof region of the interior 52.4 is not assembled in a fixed manner. In contrast, the mentioned deflection roller 82 is fastened on an essentially horizontally aligned guide cable 83 and can be moved horizontally with this.

The guide cable 83 can likewise be operated from the lower opening, just as the pull cable 81.

The transport hose 1.3 with the container envelope 8 can therefore be pulled up and lowered in the interior 52 of the facility 51.4 through the lower opening via the pull cable 81. The transport hose 1.3 with the container envelope 8 can additionally be horizontally displaced by way of the guide cable 83. In this manner, it is possible with the transport hose 1.3 to reach every location in the interior 52.4 to be cleaned.

Of course, differently constructed pull cable systems are also possible. The application of pulleys as a special form of a pull cable system is also possible.

An alternative solution to the pull cable system according to FIG. 9a is represented in FIG. 9b. Instead of a deflection roller, which is arranged on the floor of the interior 52.4, the appliance 10.6 includes an introduction aid, which is designed as a flex-tube 70.1, has a curvature of 90° and by way of which the transport hose 1.3 is deflected vertically upward from a horizontal introduction direction. The construction of a flex-tube 70.1 and its characteristics are described in detail in the general description part which is referred to.

The appliances 10.7-10.8 according to the FIGS. 10a-10b, 11 and 12 each include an introduction aid for introducing the transport hose 1.3 into the interior 52.5, 52.6 of the facility 51.5, 51.6. In this context, the embodiment of the transport hose 1.3 is of lesser significance.

FIGS. 10a-10b show an introduction aid, which is designed as a flex-tube 70.2. The construction of a flex-tube 70.2 and its characteristics are described in detail in the general description part which is referred to.

According to FIG. 10a-10b, the transport hose 1.3 is led from above through an intermediate space 53 into the interior 52.5 of the facility 51.5 to be cleaned. The transport hose 1.3 cannot be lowered vertically into the interior 52.5 since the through-openings are offset horizontally to one another.

In this case, a flex-tube 70.2 is applied, the flex-tube being assembled once in the intermediate space 53 between the two through-openings. The flex-tube 70.2 must possibly be guided along passages in the intermediate space 53, so that this has an arcuate course.

The transport hose 1.3 can now be introduced or lowered into the interior 52.3 and pulled out again, through the intermediate space 53 via the flex-tube 70.2, without much effort, for cleaning the interior 52.5.

The flex-tube 70.2 has the advantage that the transport hose 1.3 can be withdrawn out of the interior 52.5 and introduced back into this again through the flex-tube 70.2 any number of times for replacing the container envelope 8 for each cleaning cycle; this being the case without an assistant stationed in the intermediate space 53 having to manually lead the transport hose 1.3 each time.

Figure 11:
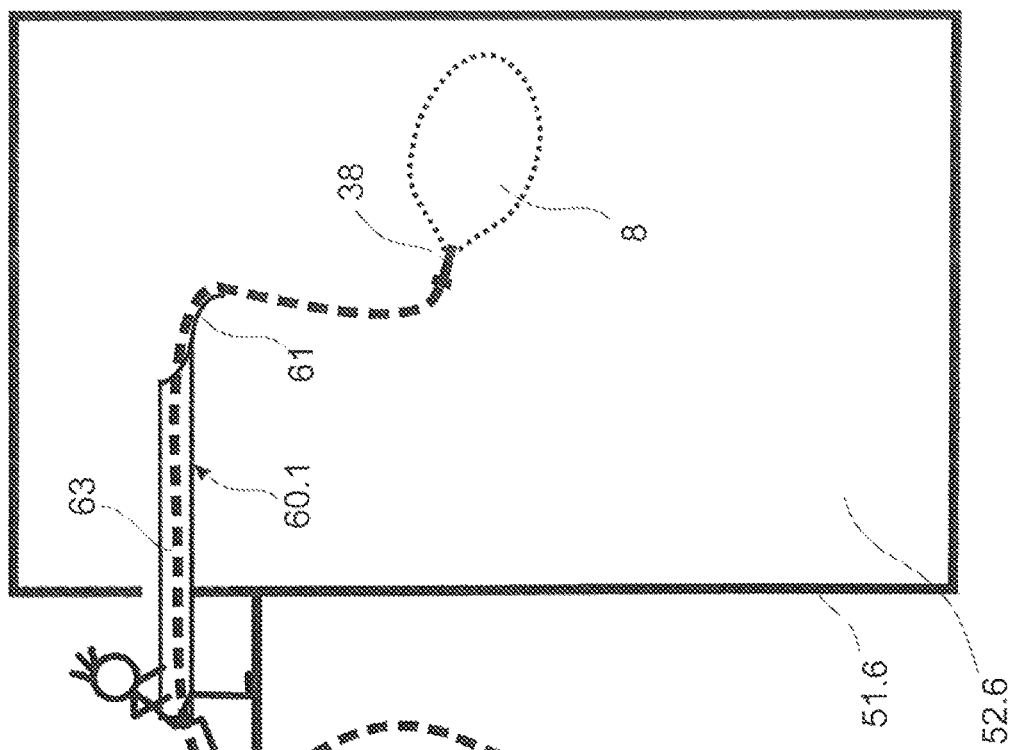
FIG. 11: a further embodiment variant of the cleaning appliance according to the invention.
Figure 12:
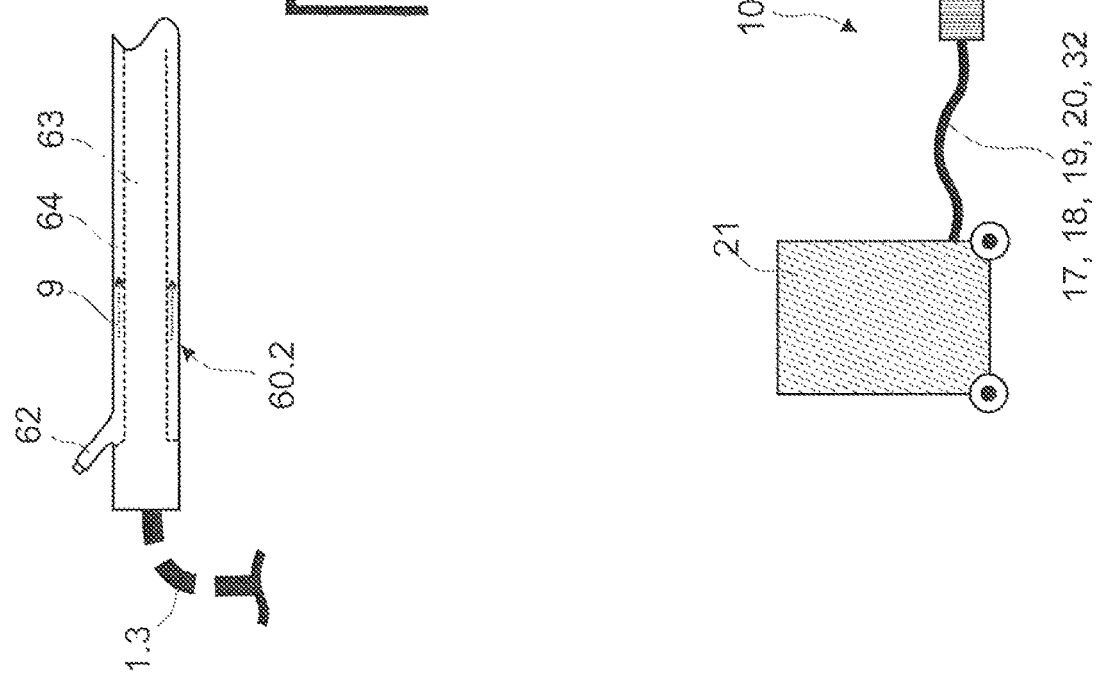
FIG. 12: a lateral view of a further embodiment variant of an introduction tube.

According to the embodiment according to FIGS. 11 and 12, a transport hose 1.3 with the container envelope 8 is introduced laterally through a lateral opening into the interior 52.6 of the facility 51.6 that is to be cleaned. The horizontal introduction length however is limited given configurations without a guide tube, as are shown in the FIGS. 3b and 5a. Furthermore, there is the risk of an abrupt bending of the transport hose 1.3 on introduction.

An introduction tube 60.1 is applied in this case, the introduction tube being pushed with a section through the opening into the interior 52.6. The construction of an introduction tube 60.1 and its characteristics are described in detail in the general description part which is referred to.

The transport hose 1.3 is pushed through the closed guide channel 63 of the introduction tube 60.1 and is led horizontally through this. The horizontal introduction depth of the transport hose 1.3 can now be determined by the insert position of the introduction tube 60.1.

The introduction tube 60.1 at is cleaning-side opening moreover includes a downwardly directed, arcuate rest 61 for the transport hose 1.3. The arcuate rest 61 forms an abrupt-bend protection for the transport hose 1.3.

The introduction tube 60.2, which is represented in FIG. 12, is characterised by a cooling device for cooling the introduction tube 60.2. The introduction tube 60.2 forms a cooling channel 64, which is arranged annularly around the guide channel 63 and which is fed with a cooling medium 9 via a connection nozzle 62. The cooling medium 9 can flow out of an exit opening at the cleaning side. A closed cooling circuit can also be provided.

The embodiment of an appliance according to the invention, shown in FIG. 13, includes an inlet device or mixing unit 101, which is only shown in part. The construction of the inlet device or mixing unit 101—with the exception of the cooling medium feed—can be constructed analogously to the embodiment example according to FIG. 4.

The inlet device or the mixing unit 101 includes an inlet nozzle 85 for introducing a cooling medium 103 into the transport channel 93. The inlet nozzle 95 is arranged downstream of the ignition device (not shown).

A transport hose 91 connects onto the inlet device or mixing unit 101 via a hose coupling with a rotary joint 105. The transport hose 91 includes a hose seal 97 towards the hose coupling 105.

A guide tube 100 is connected onto the transport hose 91 via a hose coupling 106 at the cleaning-side end of the transport hose 91. The guide tube forms an outlet opening for the explosive gas mixture. The transport hose 91 further includes a hose seal 98 ahead of the hose coupling 106.

The transport hose 91 includes an inner-lying plastic hose 92, which forms the transport channel 93. The plastic hose 92 is surrounded by a corrugated hose 94 of metal, such as steel, or plastic, which together form an annular cooling channel 107. The corrugated hose 94 in turn is surrounded by a protective hose 104, e.g., in the form of a hose braiding.

A cooling medium can be fed into the cooling channel 107 via an inlet nozzle 96 on the transport hose 91 and can be transported in the direction of the cleaning-side end of the cleaning appliance.

A check valve 99, via which the cooling medium can be led into the transport channel 93, is arranged on the transport hose 91 in the region of the cleaning-side hose coupling 98. The cooling medium 102 therefore gets into the inside of the guide tube 100 in the region of the cleanings-side hose coupling 98 and is capable of cooling this guide tube from the inside.

Instead of the connection nozzle 95, the cooling medium 103 can also be led into the transport channel 93 at the inlet device or at the mixing unit 101, analogously to the embodiment example according to FIG. 4.

The embodiment variant of a cleaning appliance according to the invention, with a supply device or metering unit 202, an inlet device or mixing unit 203 and a transport hose 204, which is shown in FIGS. 14a and 14b, is particularly applied in waste heat boilers 200 with horizontally running pipe bundles 206, as are arranged, for example, downstream of a gas turbine or a combustion engine in a gas-and-steam combination power station or a cogeneration power station. Such waste heat boilers 200 have the task of utilising hot exhaust gases from a process which takes place upstream, for generating steam or, less commonly, for the recovery of hot water.

However, the present embodiment variant is also very generally applicable to interiors of receptacles and facilities which are to be cleaned.

Waste heat boilers 200 with horizontal pipe bundles 206, when being cleaned, have the disadvantage that the transport hose with the container envelope, in contrast to the case with vertically running pipe bundles, cannot be lowered downwards from above and therefore cannot be positioned at different locations in the interior (see, e.g., FIG. 10b).

In order to completely and thoroughly clean the horizontal pipe bundles, the cleaning lance or the lance body or the transport hose with the container envelope, with each cleaning step must be positioned anew in the interior of the waste heat boiler 200 at the different cleaning locations between two pipe bundles 206, manually through a lateral access opening.

For this, the operating personnel must climb into the interior 201 of the waste heat boiler 200 anew each time and position the cleaning appliance with the container envelope at a new location for the purpose of carrying out a further cleaning step.

This is extremely awkward and difficult as well as time-consuming. Added to this is the fact that each cleaning step, i.e. explosion entails a formation of dust. The operating personnel cannot therefore immediately undertake the next cleaning step, but must wait until the dust formation has settled down before accessing into the interior 201 of the waste heat boiler 200. The cleaning is additionally delayed by way of this.

According to a present embodiment variant, a distribution unit 205 is now connected onto the cleaning-side end of the transport hose 204 via a coupling, such as a hose coupling.

The distribution unit 205 includes a plurality of outlets, here five and six thereof, for the parallel connection of positioning hoses 207a-207f A positioning hose 207a-207f is releasably connected onto an outlet each via a coupling, such as a hose coupling.

The couplings that are disclosed within the framework of this embodiment variant in particular are designed as a quick-coupling.

Whereas the transport hose 204 with the distribution unit 205 is arranged outside the receptacle or the waste heat boiler 200 to be cleaned, the positioning hoses 207a-207f are led into the receptacle interior 201. A container envelope 209a-209f is each connected to the positioning hoses 207a-207f, in particular to their cleaning-side ends. This can be effected via a connection component.

The container envelopes 209a-209f on the individual positioning hoses 207a-207f can now be positioned at different locations within the receptacle interior 201, in particular at different locations between two horizontal pipe bundles of a waste heat boiler 200.

The positioning hoses 207a-207f can be designed differently long for this.

A switchable valve 208a-208f is assigned in the distribution unit 205 to each positioning hose 207a-207f which is connected to the distribution unit 205. In this manner, explosive mixture can be led into each positioning hose 207a-207f independently of the other positioning hoses 207a-207f, as well as a container envelope 209a-209f supplied or filled with explosive mixture. The explosive mixture is fed from the transport hose 204 to the distribution unit 205. The valves 208a-208f are switchable via a control device.

The described cleaning appliance now permits several positioning hoses 207a-207f each with a connected container envelope 209a-209f to be positioned at different locations in the receptacle interior 201 in one sequence.

The container envelopes 209a-209f, subsequently to the positioning of the positioning hoses 207a-207f with the container envelopes 209a-209f are supplied and filled with explosive mixture via the positioning hoses 207a-207f and are made to explode in a controlled manner, in a sequential sequence.

A series of cleaning steps is accordingly carried out in a sequential sequence. Herein, it is not longer necessary to enter the receptacle interior 201 between the individual cleaning steps.

However, it is also conceivable for several positioning hoses or even all positioning hoses to be simultaneously charged with explosive mixture and accordingly also for several or all container envelopes 209a-209f to be simultaneously supplied or filled with an explosive mixture and made to explode.

In this case, several or all positioning hoses can also be charged with explosive mixture via a common, controllable valve in the distribution unit.

According to an alternative embodiment, one makes do without the application of a distribution unit. In contrast, the positioning hoses are successively, i.e., sequentially, manually coupled to the transport hose via a single coupling and each decoupled from this again after carrying out the cleaning step, for carrying out a sequential sequence of cleaning steps.

The invention claimed is:

1. An appliance for removing deposits in interiors of receptacles or facilities by way of explosion technology, comprising a supply device for providing at least two starting components, a transport conduit with a cleaning-side outlet opening that is connected to the supply device and serves to transport explosive mixture to a cleaning location, and a mixing unit for creating an explosive mixture from the at least two starting components, which are provided by the supply device, the mixing unit being arranged between the supply device and the transport conduit, the appliance further comprising an ignition device for controlled ignition of the explosive mixture,
wherein the transport conduit is designed at least in a section or in sections as a transport hose which serves as a conduit extension between the mixing unit and the cleaning-side outlet opening, wherein the transport hose is constructed in a multilayered manner and comprises a first hose, which is pressure-resistant with regard to radially acting pressure forces in a transport channel of the transport conduit on igniting the explosive mixture, and an inner-lying second hose, which is surrounded by the first hose and is gas-impermeable.

2. The appliance according to claim 1, wherein the second, gas-impermeable hose forms the transport channel for the explosive mixture.

3. The appliance according to claim 1, wherein an annular cooling channel is formed between the first hose and the second hose.

4. The appliance according to claim 1, wherein the first hose is formed from metal.

5. The appliance according to claim 1, wherein the first hose is braided.

6. The appliance according to claim 1, wherein the second hose is formed from or comprises plastic.

7. The appliance according to claim 1, wherein the second hose is a corrugated metal hose.

8. The appliance according to claim 1, wherein the transport hose comprises an inner-lying third hose that is surrounded by the second hose and whose inner wall has a reduced unevenness compared to the second hose.

9. The appliance according to claim 8, wherein the third hose is a stripwound hose.

10. The appliance according to claim 8, wherein the transport hose comprises an outer-lying fourth hose that surrounds the first hose and that is liquid-impermeable, wherein an annular cooling channel for a cooling medium is formed between the first hose and the fourth hose.

11. The appliance according to claim 10, wherein the fourth hose is a corrugated hose.

12. The appliance according to claim 10, wherein the fourth hose is a plastic hose.

13. The appliance according to claim 12, wherein the plastic hose consists of or comprises an ethylene propylene diene monomer rubber (EPDM) elastomer.

14. The appliance according to claim 1, wherein an inlet device with metering fittings for controlled metered introduction of the starting components into the transport hose is arranged between the supply device and the transport hose.

15. The appliance according to claim 14, wherein the inlet device or the mixing unit comprises at least one temperature sensor that is arranged in a mixing zone and measures a temperature in the mixing zone.

16. The appliance according to claim 14, wherein the inlet device or the mixing unit comprises at least one pressure sensor for measuring a pressure upstream of the mixing zone, said pressure sensor being arranged upstream of the mixing zone in a flow direction.

17. The appliance according to claim 1, wherein the appliance comprises a metering fitting for the metered introduction of the at least two starting components, wherein the metering fitting
   is contained in a metering unit or
   in the inlet device or mixing unit.

18. The appliance according to claim 14, wherein the inlet device or the mixing unit comprises metering fittings that are arranged on the feed conduits of the starting components upstream of a mixing zone in a flow direction.

19. The appliance according to claim 14, wherein the inlet device or mixing unit comprises check valves that are arranged on the feed conduits of the starting components upstream of a mixing zone in a flow direction.

20. The appliance according to claim 1, wherein the supply device comprises a metering unit for the metered provision of the at least two starting components of the explosive mixture.

21. The appliance according to claim 1, wherein a hose coupling for tool-free connection of a connection component is arranged at a cleaning-side end of the transport hose.

22. The appliance according to claim 1, wherein the transport hose at a feed side is rotatably connected to the mixing unit of the appliance via a rotary joint connection.

23. The appliance according to claim 1, wherein a guide tube is arranged at a cleaning-side end of the transport hose.

24. The appliance according to claim 1, wherein a container connection element for connecting a container envelope is arranged at a cleaning-side end of the transport hose.

25. The appliance according to claim 1, wherein one or more positioning hoses are connected directly or indirectly to a cleaning-side end of the transport hose.

26. The appliance according to claim 1, wherein the appliance comprises a flex-tube, by way of which the transport hose can be led through passages in the interior of the receptacle or facility to be cleaned.

27. The appliance according to claim 1, wherein the appliance comprises an introduction tube, by way of which the transport hose can be introduced via an opening into the interior of the receptacle or facility to be cleaned, wherein a horizontal introduction depth of the transport hose into the interior can be determined via the insert position of the introduction tube.

28. A method for removing deposits from of receptacles and facilities by way of explosion technology with an appliance according to the claim 1, comprising the steps of:
   providing an explosive mixture in the transport conduit, and
   transporting the explosive mixture to a cleaning-side outlet opening of the transport conduit;
   controlled ignition of the explosive mixture via an ignition device, wherein the explosive mixture is brought to explode.

29. The method according to claim 28, further comprising the steps of:
   attaching a container envelope to the cleaning-side outlet opening of the transport conduit;
   filling the container envelope with the explosive mixture that exits through the cleaning-side outlet opening of the transport conduit.

30. The method according to claim 28, further comprising the steps of:
   outflow of the explosive mixture through at least one cleaning-side outlet opening of the transport conduit into the interior of the receptacle or facility to be cleaned and formation of a cloud from the explosive mixture.

31. The method according to claim 28, further comprising the steps of:
   positioning several positioning hoses each with a container envelope, which is attached to the positioning hose, at different locations in the interior of the receptacle or facility to be cleaned;
   parallel or sequential connecting of the positioning hoses onto the transport conduit in a direct or indirect manner;
   charging the connected positioning hoses in a sequential sequence with explosive mixture and supplying the container envelopes with explosive mixture and, by way of this, producing several cleaning explosions in a sequential sequence.

* * * * *